United States Patent
Yaosaka

(10) Patent No.: US 9,554,278 B2
(45) Date of Patent: Jan. 24, 2017

(54) RELAY APPARATUS, RELAY METHOD, RELAY SYSTEM, AND NON-TRANSITORY COMPUTER-READABLE STORAGE MEDIUM

(71) Applicant: CANON KABUSHIKI KAISHA, Tokyo (JP)

(72) Inventor: Akira Yaosaka, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/644,309

(22) Filed: Mar. 11, 2015

(65) Prior Publication Data

US 2015/0271678 A1    Sep. 24, 2015

(30) Foreign Application Priority Data

Mar. 20, 2014 (JP) .................................. 2014-059081

(51) Int. Cl.
*G06F 7/04* (2006.01)
*H04W 12/08* (2009.01)
*H04W 4/00* (2009.01)
*H04W 84/12* (2009.01)

(52) U.S. Cl.
CPC ............. *H04W 12/08* (2013.01); *H04W 4/008* (2013.01); *H04W 84/12* (2013.01)

(58) Field of Classification Search
CPC .................................. H04L 63/08; H04L 63/10
USPC ............................................................ 726/4
See application file for complete search history.

(56) References Cited

U.S. PATENT DOCUMENTS

| 2011/0202988 | A1* | 8/2011 | Otranen | ................ H04L 9/3213 726/8 |
| 2013/0013673 | A1* | 1/2013 | Ahmed | ............. G06F 17/30902 709/203 |
| 2014/0215048 | A1 | 7/2014 | Nakajima | ..................... 709/223 |
| 2014/0227976 | A1* | 8/2014 | Callaghan | ................ G06F 8/65 455/41.2 |

FOREIGN PATENT DOCUMENTS

JP            2011-39793         2/2011

* cited by examiner

*Primary Examiner* — Anthony Brown
(74) *Attorney, Agent, or Firm* — Fitzpatrick, Cella, Harper & Scinto

(57) ABSTRACT

A relay apparatus detects a request, sent from a communication apparatus, to grant an access authority for a desired resource, sends, in the case where the request to grant the access authority has been detected, an authorization request requesting the granting of the access authority to a server, receives an authorization response, which is a response to the authorization request, from the server, saves the authorization response, generates an authorization relay response based on the authorization response, and sends the authorization relay response to the communication apparatus, wherein in the case where a request to grant the access authority sent from another communication apparatus different from the communication apparatus has been detected, the relay apparatus sends the authorization relay response in response to the request to the other communication apparatus based on the saved authorization response.

12 Claims, 20 Drawing Sheets

2400

2401

2402

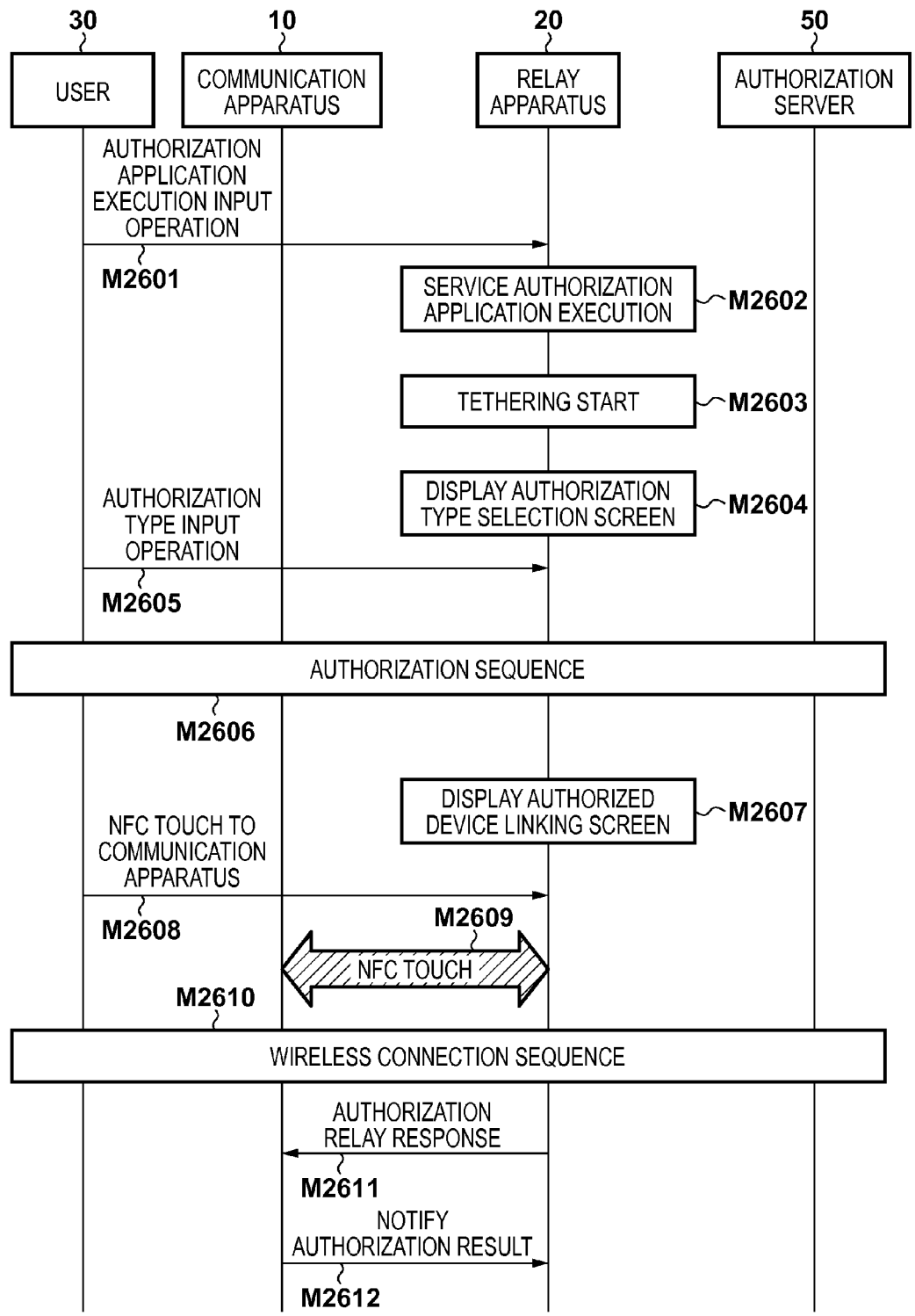

RELAY APPARATUS, RELAY METHOD, RELAY SYSTEM, AND NON-TRANSITORY COMPUTER-READABLE STORAGE MEDIUM

BACKGROUND OF THE INVENTION

Field of the Invention

The present invention relates to authorization systems configured of a communication apparatus, a relay apparatus, and an authorization server, and particularly relates to relay apparatuses, relay methods, relay systems, and non-transitory computer-readable storage media for granting access authority to a communication apparatus with an authorization server.

Description of the Related Art

Recently, there are cellular phones, digital cameras, and the like that have functions for accessing resource servers for content sharing services, communication services, and the like on the Internet. A user can upload image content to a photo-sharing service, send messages to friends, or the like by using such communication apparatuses. Normally, a resource server for a photo-sharing service or the like manages access authority for resources such as content, files, and the like on the resource server in tandem with an authorization server (Japanese Patent Laid-Open No. 2011-39793).

Authorization servers are increasingly using the OAuth protocol to manage (grant) access authority. The authorization code type and the implicit type are examples of authorization types for obtaining an access token according to OAuth. In the case of the authorization code type, first, a communication apparatus obtains, from an authorization server, an access token indicating access authority for a desired resource and a refresh token for refreshing the access token. In the case of the implicit type, first, the communication apparatus obtains the access token from the authorization server. When making a request to obtain the desired resource from a resource server, the communication apparatus issues the request along with the access token obtained from the authorization server. The resource server sends the requested resource to the communication apparatus only in the case where the access token is valid. With the authorization code type, in the case where the access token has expired, the communication apparatus can refresh the access token by providing the refresh token to the authorization server.

The authorization server requires the user's authorization when delegating the user's access authority to the communication apparatus using the OAuth protocol. Normally, the authorization server presents an HTML screen for the user to carry out an operation for granting the access authority, and the user carries out the operation for granting the access authority in a web browser.

However, when the authorization server distributes the same access token to multiple communication apparatuses according the conventional technique, it is assumed that the user will need to carry out the operation for granting access authority using the web browser each time an access token is distributed. In other words, it is necessary for the user to carry out user authentication and operations for granting the access authority the same number of times as there are communication apparatuses. Such operations are complicated for the user.

SUMMARY OF THE INVENTION

Having been conceived in light of the aforementioned problems, it is an object of the present invention to lighten the burden of user operations with respect to a process for granting access authority.

According to one aspect of the present invention, there is provided a relay apparatus capable of relaying communication between a communication apparatus and a server, which comprises: a detection unit configured to detect a request, sent from the communication apparatus, to grant an access authority for a desired resource; a first sending unit configured to send, in the case where the request to grant the access authority has been detected by the detection unit, an authorization request requesting the granting of the access authority to the server; a receiving unit configured to receive an authorization response, which is a response to the authorization request, from the server; a saving unit configured to save the authorization response received by the receiving unit; a generating unit configured to generate an authorization relay response based on the authorization response; and a second sending unit configured to send the authorization relay response generated by the generating unit to the communication apparatus, wherein in the case where a request to grant the access authority sent from another communication apparatus different from the communication apparatus has been detected, the second sending unit sends the authorization relay response in response to the request to the other communication apparatus based on the authorization response saved by the saving unit.

Further features of the present invention will become apparent from the following description of exemplary embodiments (with reference to the attached drawings).

BRIEF DESCRIPTION OF THE DRAWINGS

FIG. 23 is a sequence chart illustrating an example of messages exchanged in an authorization sequence (a group mode) according to the second embodiment.

DESCRIPTION OF THE EMBODIMENTS

First Embodiment

Figure 1:
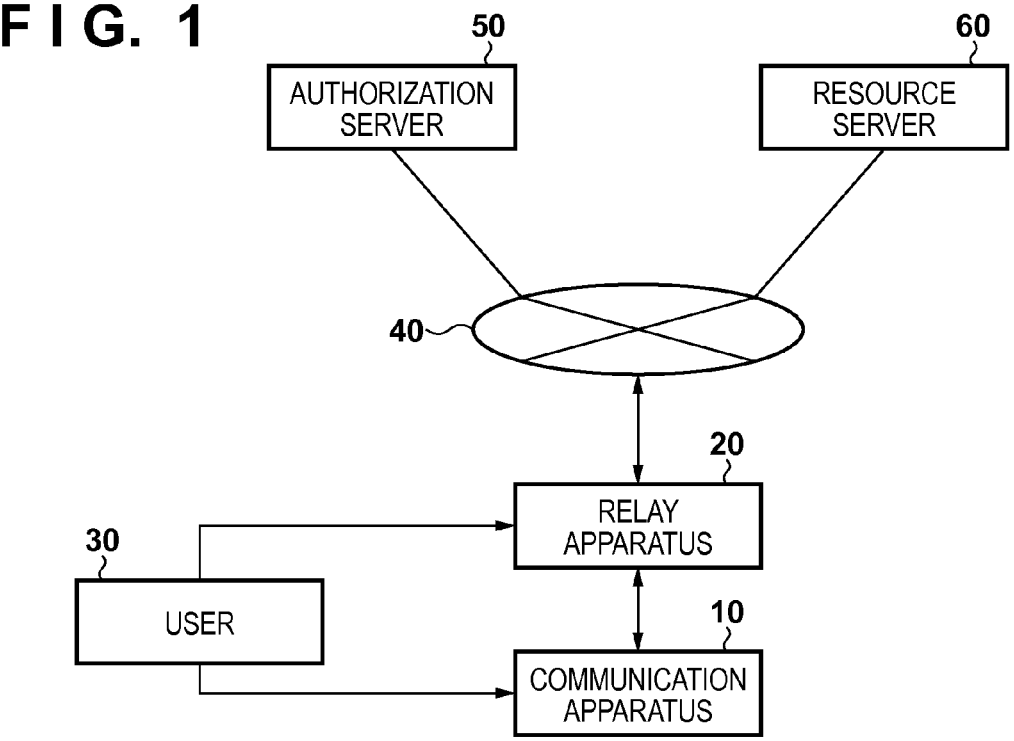
FIG. 1 is a diagram illustrating an example of the configuration of an authorization system according to a first embodiment.

The present embodiment describes a case in which a user 30 operates a communication apparatus 10 and starts an authorization process from the communication apparatus 10. FIG. 1 is a diagram illustrating an example of the configuration of an authorization relay system according to the present embodiment. The communication apparatus 10 corresponds to a communication apparatus according to the present invention, and includes a display function, an operation function, a wireless LAN (Local Area Network) communication function based on IEEE 802.11, and an NFC (Near Field Communication) communication function. However, in the present embodiment, it is assumed that the communication apparatus 10 does not include a web browser function, or includes a web browser function but the web browser function cannot be used. A digital camera, a digital video camera, a printer, a television, a video recorder, and so on can be given as specific examples of the communication apparatus 10. The communication apparatus 10 uses the NFC communication function as first wireless communication. Although the communication apparatus 10 uses the NFC communication function as the first wireless communication in the present embodiment, the invention is not limited thereto, and another close-proximity wireless communication standard such as Bluetooth (registered trademark), ZigBee (registered trademark), RFID, or the like may be used instead. Meanwhile, the communication apparatus 10 uses the wireless LAN communication function as second wireless communication. Although the communication apparatus 10 uses the wireless LAN communication function as the second wireless communication in the present embodiment, the invention is not limited thereto, and another communication standard such as a wired LAN communication function, a WAN (Wide Area Network) communication function, or the like may be used instead.

A relay apparatus 20 corresponds to a relay apparatus according to the present invention, and includes a display function, an operation function, a wireless LAN communication function, an NFC communication function, and a public wireless communication function such as 3G, LTE (Long Term Evolution), or the like. Furthermore, in the present embodiment, the relay apparatus 20 includes a web browser function. A cellular phone, a smartphone, a PC, or the like can be given as specific examples of the relay apparatus 20. Although the relay apparatus 20 uses the wireless LAN communication function and the NFC communication function in the present embodiment in the same manner as the communication apparatus 10, the invention is not limited thereto, and another communication standard may be used instead. Likewise, although the relay apparatus 20 uses the public wireless communication function in the present embodiment, the invention is not limited thereto, and another communication standards such as the wireless LAN communication function, a wired LAN communication function, or the like may be used instead. In addition, in the present embodiment, the relay apparatus 20 includes a tethering function, and communicates with an authorization server 50 and a resource server 60 over public wireless communication by relaying the wireless LAN communication from the communication apparatus 10.

The user 30 corresponds to a user according to the present invention, and uses the communication apparatus 10 and the relay apparatus 20. A network 40 is a network that connects the relay apparatus 20, the authorization server 50, and the resource server 60. A wired LAN, a wireless LAN, a WAN, the Internet, and the like can be given as specific examples of the network 40. The authorization server 50 corresponds to an authorization server according to the present invention, and manages access authority to resources on the resource server 60 according to OAuth 2.0. Although OAuth 2.0 is used as the OAuth protocol in the present embodiment, it should be noted that the invention is not limited thereto, and another authorization standard such as OAuth 1.0 and OpenID Connect, a proprietary authorization method, or the like may be used instead. The resource server 60 corresponds to a resource server according to the present invention, and manages resources held by the user of the communication apparatus 10.

Figure 2:
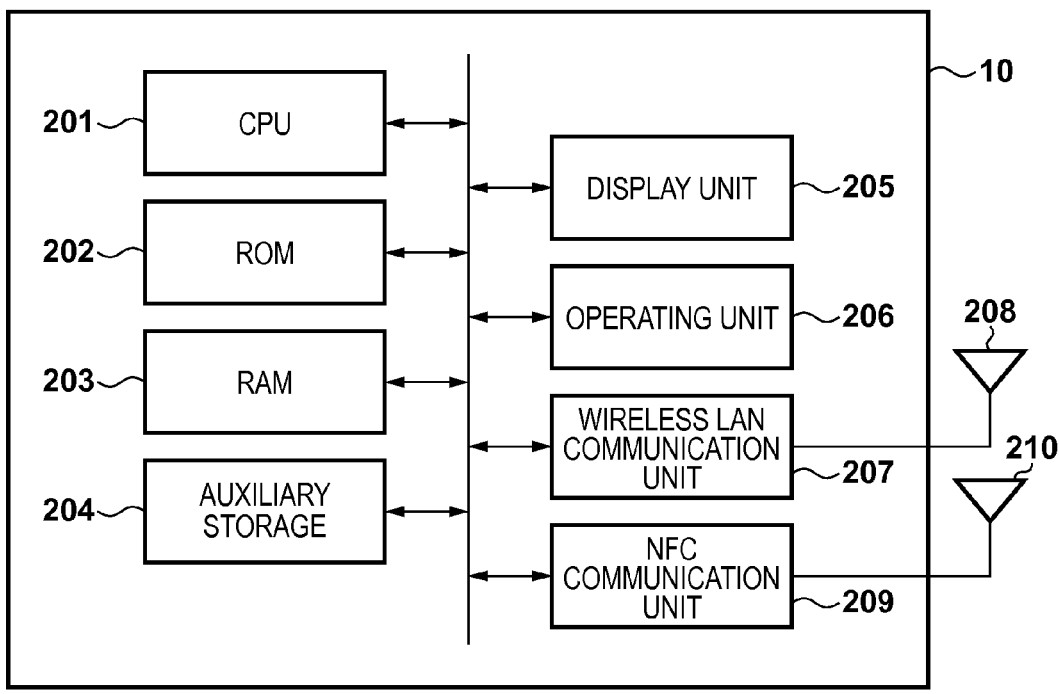
FIG. 2 is a block diagram illustrating an example of the hardware configuration of a communication apparatus 10 according to the first embodiment.

Next, constituent elements of the authorization system according to the present embodiment will be described in detail. FIG. 2 is a block diagram illustrating an example of the hardware configuration of the communication apparatus 10 according to the present embodiment. The communication apparatus 10 includes a CPU (Central Processing Unit) 201, a ROM (Read-Only Memory) 202, a RAM (Random Access Memory) 203, auxiliary storage 204, a display unit 205, an operating unit 206, a wireless LAN communication unit 207, a wireless LAN antenna 208, an NFC communication unit 209, and an NFC antenna 210.

The CPU 201 controls the communication apparatus 10 as a whole. The ROM 202 stores programs, parameters, and so on that do not need to undergo changes. The RAM 203 temporarily stores programs, data, and so on supplied from the auxiliary storage 204 or the like. The auxiliary storage 204 stores configuration data such as wireless parameters, content data such as images and videos, and so on. A memory card, a hard disk, or the like can be given as example of the auxiliary storage 204. The display unit 205 displays a GUI (Graphical User Interface) through which the user operates the communication apparatus 10. The operating unit 206 is an input interface through which the user operates the communication apparatus 10. The wireless LAN communication unit 207 controls the wireless LAN antenna 208 and carries out wireless LAN communication with the relay apparatus 20. The NFC communication unit 209 controls the NFC antenna 210 and carries out NFC communication with the relay apparatus 20.

Figure 4:
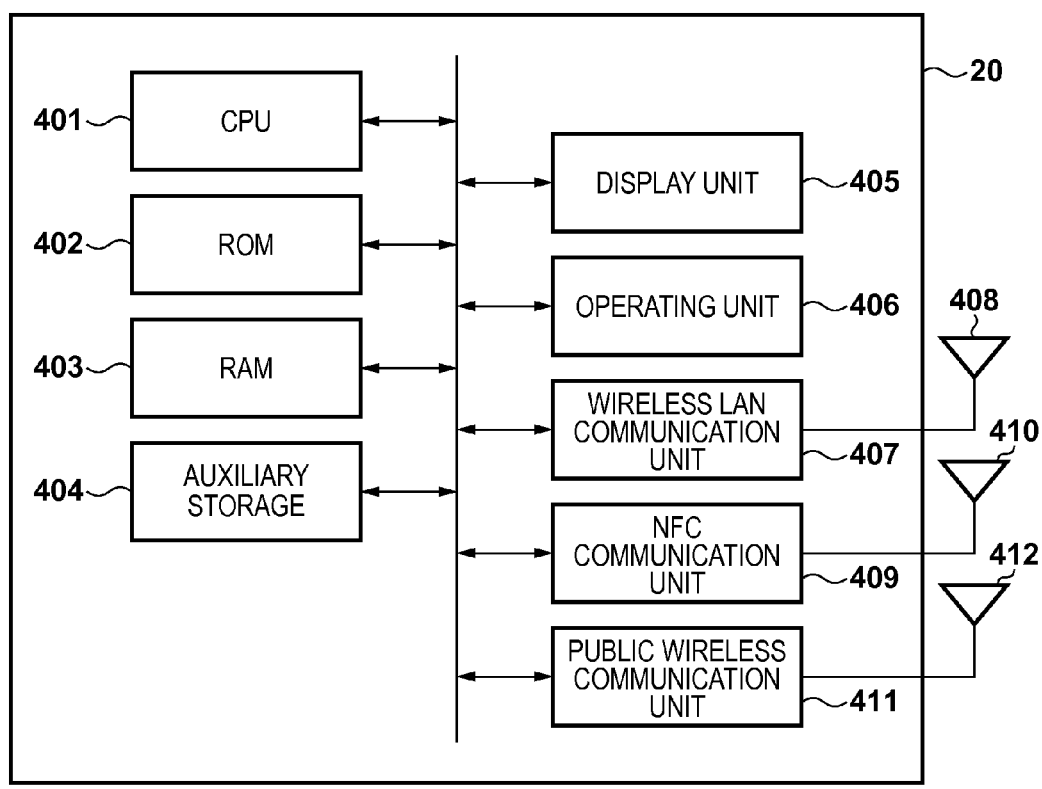
FIG. 4 is a block diagram illustrating an example of the hardware configuration of a relay apparatus 20 according to the first embodiment.

FIG. 4 is a block diagram illustrating an example of the hardware configuration of the relay apparatus 20 according to the present embodiment. With respect to the hardware of the relay apparatus 20, descriptions of hardware that is the same as that in the communication apparatus 10 illustrated in FIG. 2 will be omitted, and only the differences will be mentioned. The relay apparatus 20 includes a CPU 401, a ROM 402, a RAM 403, auxiliary storage 404, a display unit 405, an operating unit 406, a wireless LAN communication unit 407, a wireless LAN antenna 408, an NFC communication unit 409, an NFC antenna 410, a public wireless communication unit 411, and a public wireless antenna 412. The public wireless communication unit 411 controls the public wireless antenna 412 and carries out public wireless communication with the authorization server 50 and the resource server 60.

Figure 3:
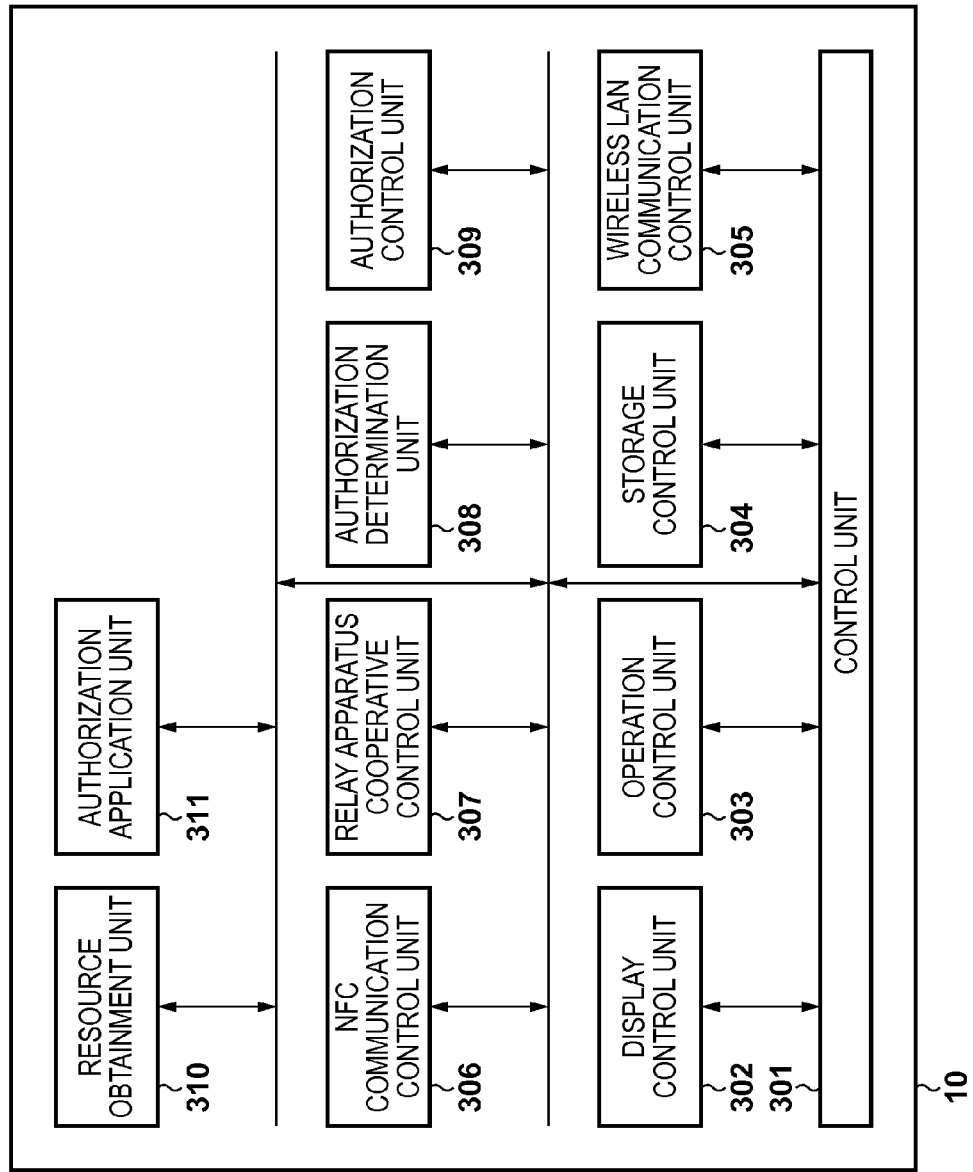
FIG. 3 is a block diagram illustrating an example of the functional module configuration of the communication apparatus 10 according to the first embodiment.

FIG. 3 is a block diagram illustrating an example of the functional module configuration of the communication apparatus 10 according to the present embodiment. The communication apparatus 10 includes a control unit 301, a display control unit 302, an operation control unit 303, a storage control unit 304, a wireless LAN communication control unit 305, an NFC communication control unit 306, a relay apparatus cooperative control unit 307, an authorization determination unit 308, an authorization control unit 309, and a resource obtainment unit 310.

The control unit 301 carries out overall control of the respective functional modules provided in the communication apparatus 10. The display control unit 302 controls the display unit 205 and carries out display control for the GUI in the communication apparatus 10. The operation control unit 303 controls the operating unit 206 and carries out control for operational inputs made by the user in the communication apparatus 10. The storage control unit 304 controls the auxiliary storage 204 and stores image content data, video content data, and the like. The wireless LAN communication control unit 305 controls the wireless LAN communication unit 207 and controls the wireless LAN communication with the relay apparatus 20. In the present embodiment, the wireless LAN communication control unit 305 controls the wireless LAN communication with the relay apparatus 20 according to the WPS (Wi-Fi Protected Access) method. Although the WPS method is used in the present embodiment, the invention is not limited thereto, and another wireless LAN communication standard such as WPA (Wi-Fi Protected Access), WPA2, Wi-Fi Direct, or the like may be used instead.

The NFC communication control unit 306 controls the NFC communication unit 209 and controls the NFC communication with the relay apparatus 20. The NFC communication control unit 306 sends communication apparatus information regarding the communication apparatus 10 to the relay apparatus 20 and receives relay apparatus information regarding the relay apparatus 20 from the relay apparatus 20. Although the NFC communication method is used in the present embodiment, the invention is not limited thereto, and another short-range wireless communication method such as BT (Bluetooth (registered trademark)), BT-LE (Bluetooth (registered trademark) Low Energy), or the like may be used instead.

The relay apparatus cooperative control unit 307 carries out cooperative control with the relay apparatus 20 by using the wireless LAN communication control unit 305 and the NFC communication control unit 306. Specifically, the relay apparatus cooperative control unit 307 carries out discovery control for discovering and advertising devices on the wireless LAN, service control for using and providing services provided by devices on the wireless LAN, and so on. In the present embodiment, the relay apparatus cooperative control unit 307 carries out the discovery and advertisement using SSDP (Simple Service Discovery Protocol). Meanwhile, the relay apparatus cooperative control unit 307 provides and controls services through HTTP (HyperText Transfer Protocol). Although SSDP and HTTP are used in the present embodiment, the invention is not limited thereto, and other discovery and service communication standards, such as mDNS (Multicast Dynamic Name Service), UPnP (Universal Plug And Play), DLNA (Digital Living Network Alliance), SOAP, REST (Representational State Transfer), AtomPub (Atom Publishing Protocol), or the like, may be used instead.

The authorization determination unit 308 determines whether or not to carry out an authorization process. The authorization control unit 309 carries out the authorization process between the relay apparatus 20 and the authorization server 50 using the wireless LAN communication control unit 305. In the present embodiment, the authorization control unit 309 carries out the authorization process according to the OAuth 2.0 method. Specifically, the authorization control unit 309 generates an authorization relay request based on authorization relay request information 1700 illustrated in FIG. 16, and sends the authorization relay request to an authorization relay service provided by the relay apparatus 20. The authorization control unit 309 then receives, from the relay apparatus 20, an authorization relay response based on authorization relay response information 2000 or 2010 illustrated in FIG. 19. Thereafter, the authorization control unit 309 generates an access token request based on OAuth, and sends the access token request to the authorization server 50. The authorization control unit 309 then receives an access token response based on OAuth from the authorization server 50. Although OAuth 2.0 is used in the present embodiment, the invention is not limited thereto, and another authorization method such as OAuth 1.0, OpenID Connect, SAML (Security Assertion Markup Language), Kerberos, or the like may be used instead.

The resource obtainment unit 310 obtains a desired resource from the resource server 60 via the relay apparatus 20 using the wireless LAN communication control unit 305. In the present embodiment, "resource" refers to a resource according to REST. Specifically, "resource" refers to content data such as electronic files, electronic data, images/videos, and so on, as well as metadata regarding containers and content such as directories and albums, and the like. Furthermore, functions, actions, and APIs (Application Program Interfaces) for various services provided by the resource server 60 (storage, content sharing, printing, payments, and the like) can also be realized as resources. Further still, although the resource obtainment unit 310 obtains (downloads) the resources in the present embodiment, the invention is not limited thereto, and other resource operations such as generating (uploading), updating, deleting, and so on, which are basic operations according to REST, may be carried out as well. An authorization application unit 311 is an application that enables the user 30 to authorize the communication apparatus 10.

Figure 5:
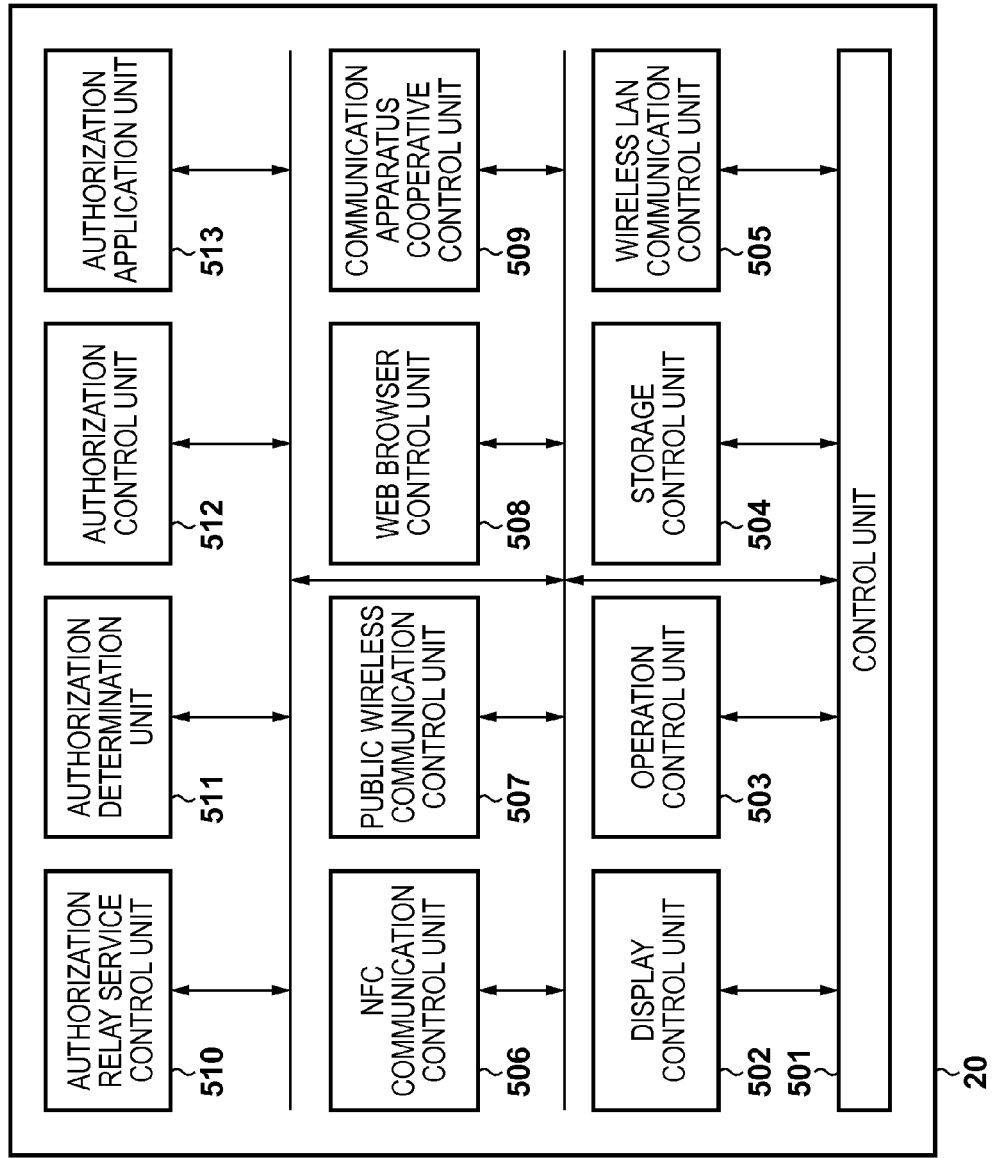
FIG. 5 is a block diagram illustrating an example of the functional module configuration of the relay apparatus 20 according to the first embodiment.

FIG. 5 is a block diagram illustrating an example of the functional module configuration of the relay apparatus 20 according to the present embodiment. With respect to the functional modules of the relay apparatus 20, descriptions of functional modules that are the same as those in the communication apparatus 10 illustrated in FIG. 3 will be omitted, and only the differences will be mentioned. The relay apparatus 20 includes a control unit 501, a display control unit 502, an operation control unit 503, a storage control unit 504, a wireless LAN communication control unit 505, an NFC communication control unit 506, a public wireless communication control unit 507, a web browser control unit 508, a communication apparatus cooperative control unit 509, an authorization relay service control unit 510, an authorization determination unit 511, an authorization control unit 512, and an authorization application unit.

The NFC communication control unit 506 controls the NFC communication unit 409 and controls the NFC communication with the communication apparatus 10. The NFC communication control unit 506 receives the communication apparatus information regarding the communication apparatus 10 from the communication apparatus 10 and sends the relay apparatus information regarding the relay apparatus 20 to the communication apparatus 10. The public wireless communication control unit 507 controls the public wireless communication unit 411, connects to the network 40, and carries out communication between the authorization server 50 and the resource server 60. Although a public wireless communication method is used in the present embodiment, the invention is not limited thereto, and another communication standard such as wireless LAN, wired LAN, WAN, or the like may be used instead. The web browser control unit 508 controls the display control unit 502 and displays a web browser. In the present embodiment, the web browser control unit 508 is used when displaying a user authentication screen and an access authority granting screen, written in HTML (HyperText Markup Language), provided by the authorization server 50. The communication apparatus cooperative control unit 509 is the same as the relay apparatus cooperative control unit 307 illustrated in FIG. 3, and carries out cooperative control with the communication apparatus 10.

The authorization relay service control unit 510 provides the authorization relay service to the communication apparatus 10 using the communication apparatus cooperative control unit 509. In the present embodiment, the authorization relay service control unit 510 receives, from the communication apparatus 10, the authorization relay request based on the authorization relay request information 1700 illustrated in FIG. 16. The authorization relay service control unit 510 then carries out the authorization process with the authorization server 50 using the authorization control unit 512. Then, the authorization relay service control unit 510 generates the authorization relay response information 2000 or 2010 illustrated in FIG. 19 based on an authorization result from the authorization server 50, and sends the authorization relay response to the communication apparatus 10.

The authorization determination unit 511 determines whether or not to carry out the authorization process. The authorization control unit 512 carries out the authorization process with the authorization server 50 using the wireless LAN communication control unit 505. In the present embodiment, the authorization control unit 512 carries out the authorization process according to the OAuth 2.0 method, in the same manner as the authorization control unit 309 illustrated in FIG. 3. Specifically, the authorization control unit 512 generates an authorization request based on an authorization request 1800 illustrated in FIG. 17, and sends the authorization request to the authorization server 50. Thereafter, the authorization control unit 512 carries out user authentication and access authority granting with the authorization server 50. Then, as a response to that result, the authorization control unit 512 receives an authorization response based on authorization response information 1900 or 1910 illustrated in FIG. 18. Although OAuth 2.0 is used in the present embodiment, the invention is not limited thereto, and another authorization method may be used instead, in the same manner as with the authorization control unit 309 illustrated in FIG. 3. Note also that the functional blocks illustrated in FIGS. 3, 5, and so on are not limited to being provided by software, and may be provided by hardware instead. The functional blocks illustrated in FIGS. 3, 5, and so on are interrelated. Further still, the functional blocks illustrated in FIGS. 3, 5, and so on are examples; a single functional block may be made up of multiple functional blocks, and any of the functional blocks may be further divided into blocks that perform multiple functions.

Figure 15A:
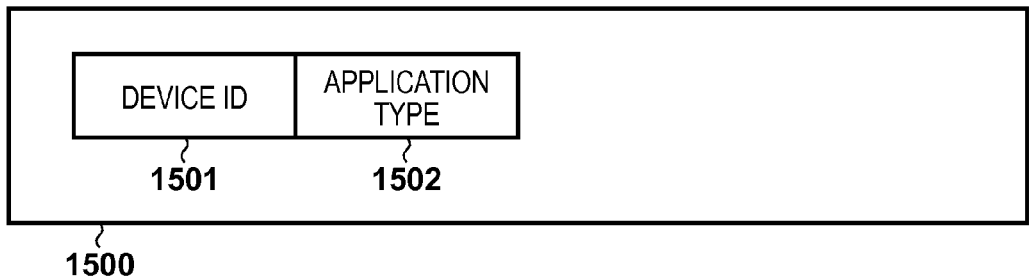
FIG. 15A is a diagram illustrating an example of the data structure of communication apparatus information.

FIG. 15A is a diagram illustrating an example of the data structure of the communication apparatus information according to the present embodiment. Communication apparatus information 1500 corresponds to the overall communication apparatus information according to the present embodiment. A device ID 1501 is an identifier that uniquely specifies the communication apparatus 10. This is, for example, a MAC (Media Access Control) address, a product serial number, or the like. Meanwhile, the device ID 1501 may be issued to the communication apparatus 10 by the authorization server 50 prior to the authorization process described in the present embodiment.

Application type 1502 indicates the type of an application requested to be executed by the relay apparatus 20. In the present embodiment, the application type 1502 is information indicating an authorization application.

Figure 15B:
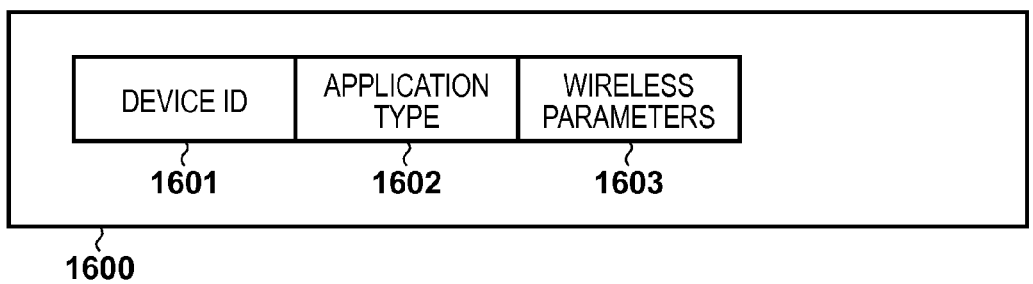
FIG. 15B is a diagram illustrating an example of the data structure of relay apparatus information, according to the first embodiment.

FIG. 15B is a diagram illustrating an example of the data structure of the relay apparatus information according to the present embodiment. With respect to the relay apparatus information, descriptions of data items that are the same as those in the communication apparatus information illustrated in FIG. 15A will be omitted, and only the differences will be mentioned. Relay apparatus information 1600 corresponds to the overall relay apparatus information according to the present embodiment. Wireless parameters 1603 are information regarding a wireless LAN access point necessary for wireless LAN communication with the relay apparatus 20. Specifically, this information is a SSID (Service Set Identifier), an encrypted communication method, an encryption key, a wireless LAN communication method, or the like.

Figure 6:
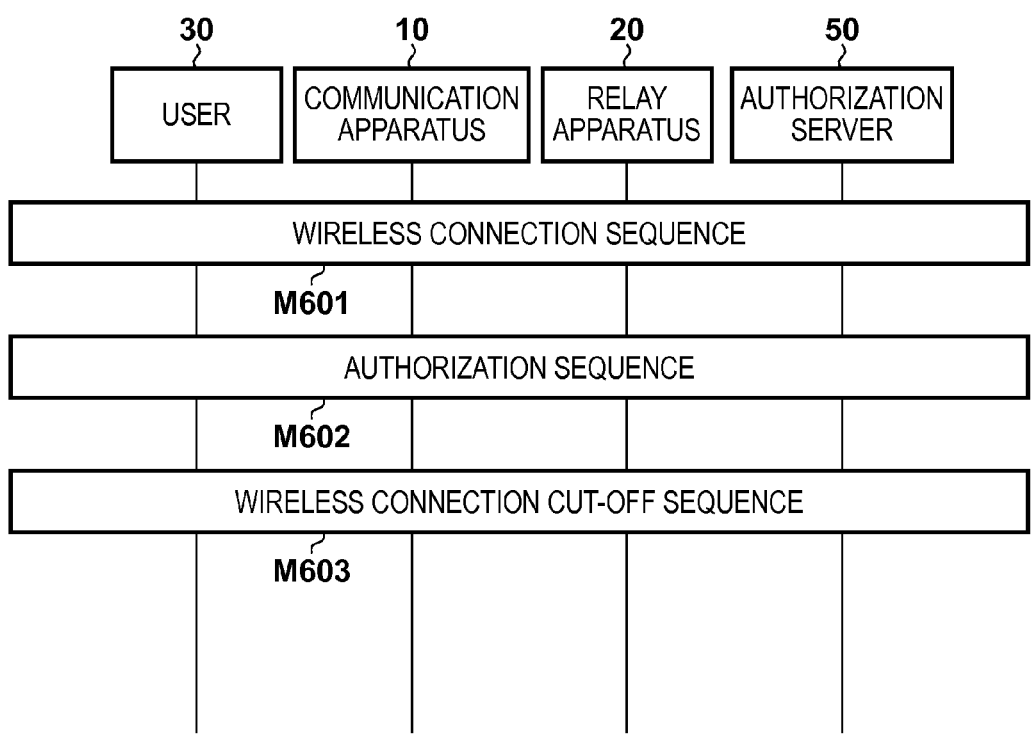
FIG. 6 is a sequence chart illustrating an overall example of messages according to the first embodiment.
Figure 7:
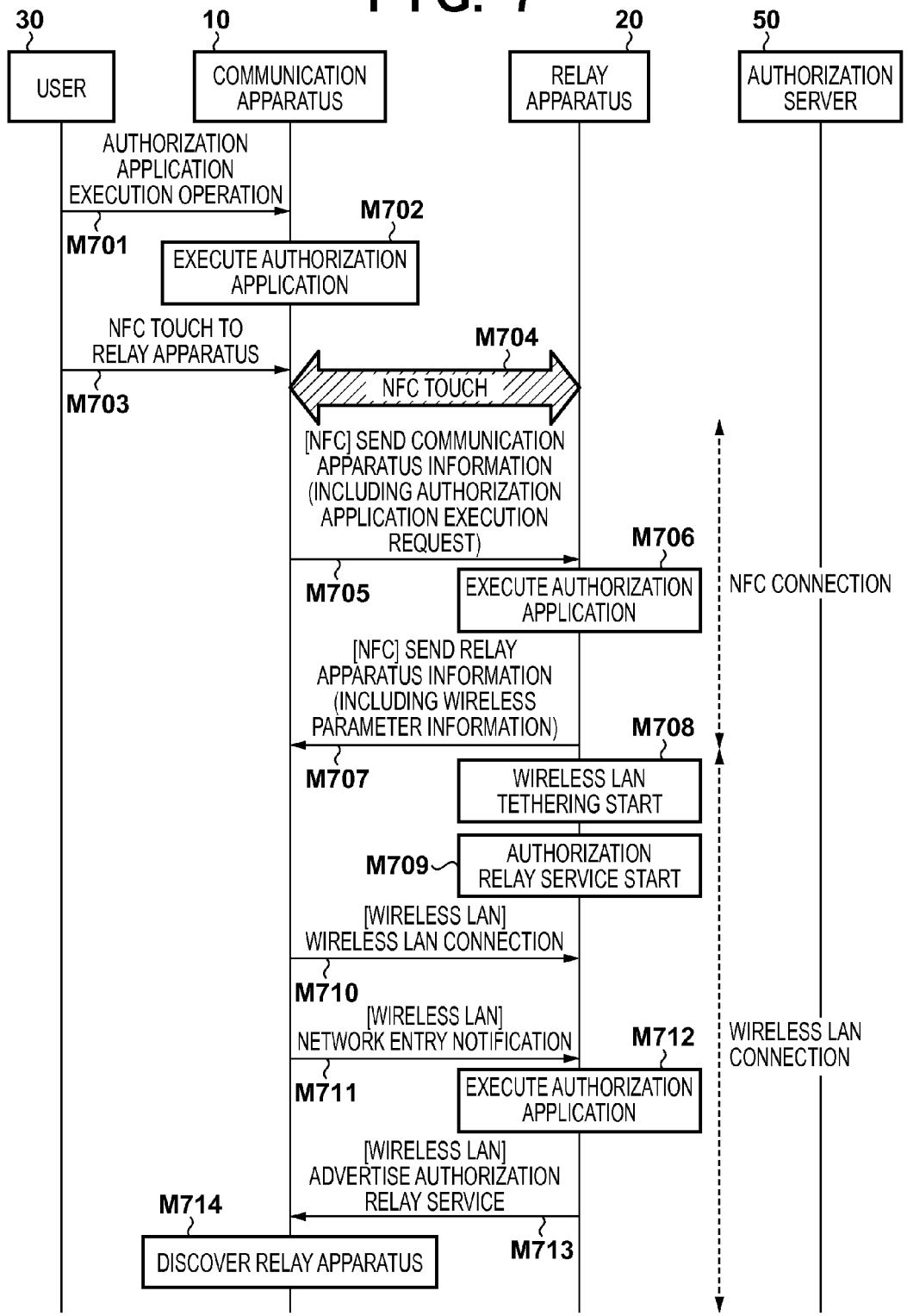
FIG. 7 is a sequence chart illustrating an example of messages exchanged during a wireless connection between the communication apparatus 10 and the relay apparatus 20 according to the first embodiment.
Figure 8:
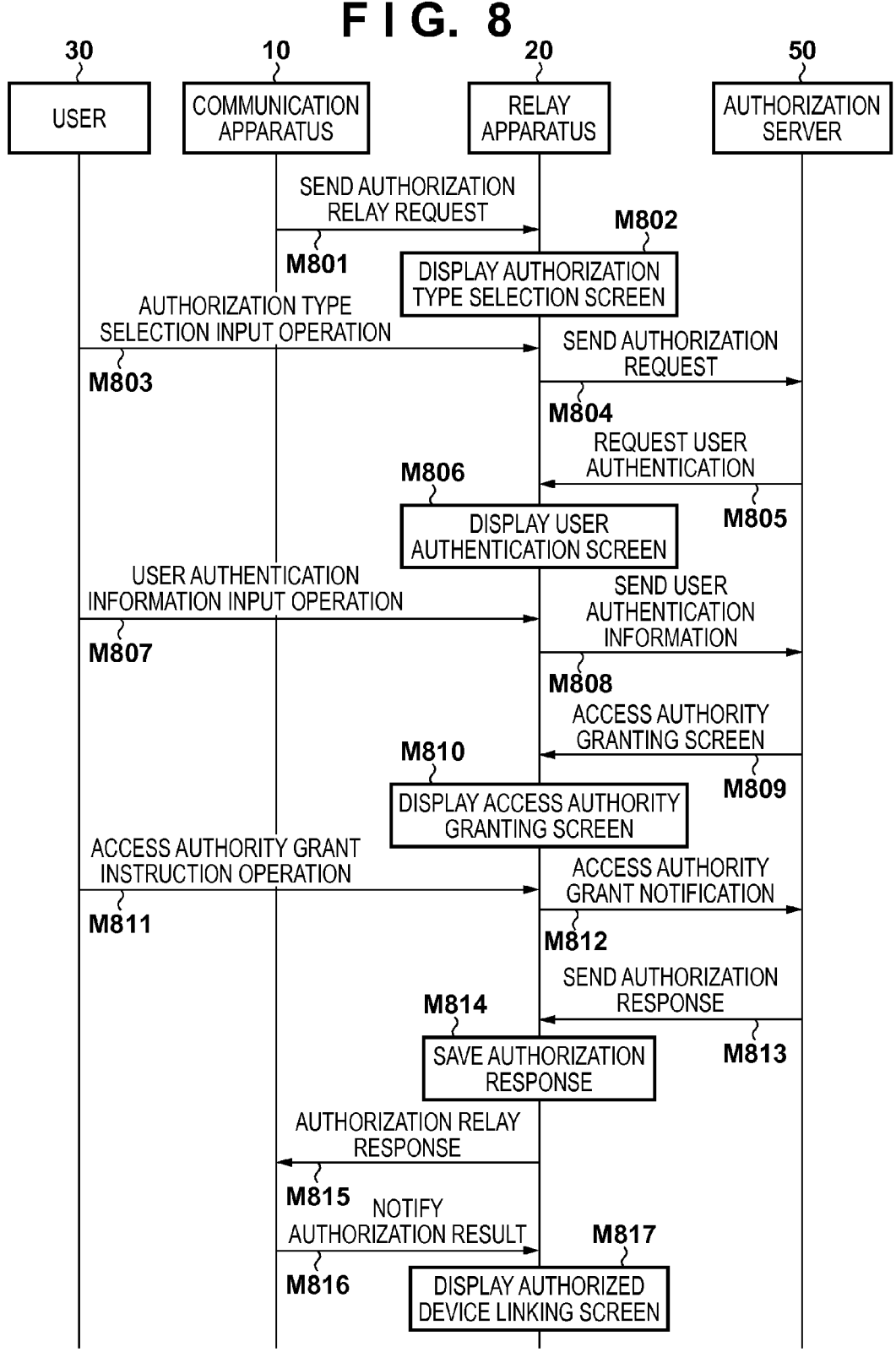
FIG. 8 is a sequence chart illustrating an example of messages exchanged when carrying out authorization according to the first embodiment.
Figure 9:
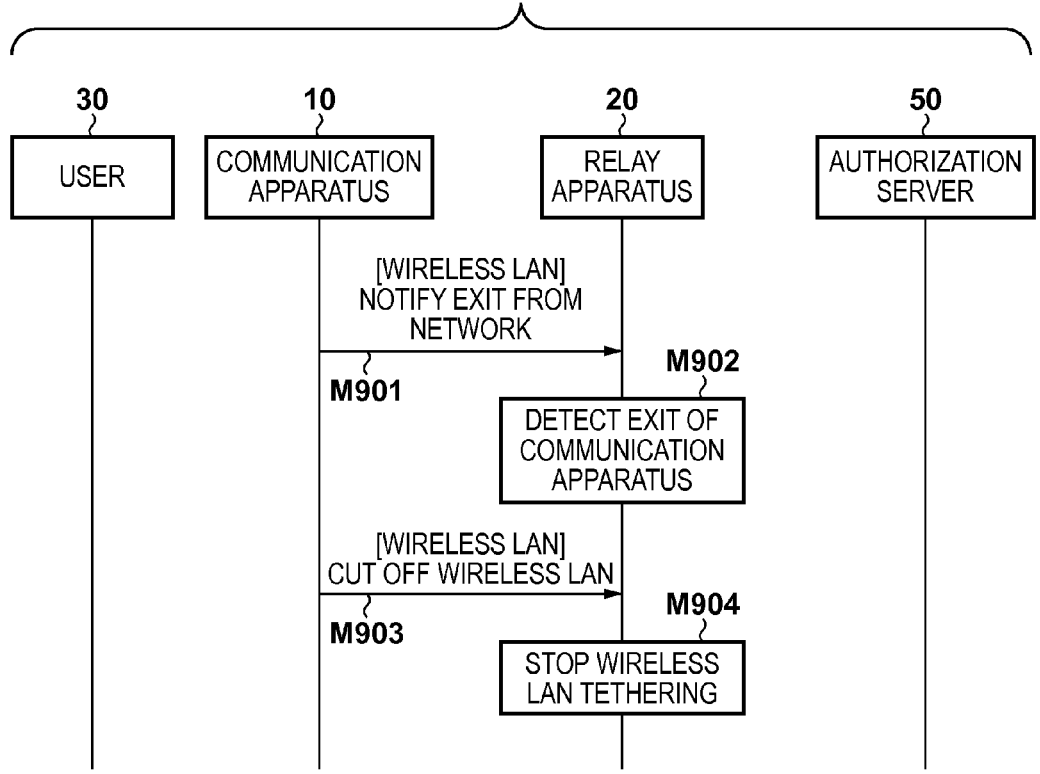
FIG. 9 is a sequence chart illustrating an example of messages exchanged when cutting a wireless connection between the communication apparatus 10 and the relay apparatus 20 according to the first embodiment.

FIG. 6 is a sequence chart illustrating an overall example of messages in the authorization system according to the present embodiment. In M601, the communication apparatus 10 and the relay apparatus 20 connect wirelessly. Details are illustrated in FIG. 7. In M602, the communication apparatus 10, the relay apparatus 20, and the authorization server 50 carry out authorization. Details are illustrated in FIG. 8. In M603, the communication apparatus 10 and the relay apparatus 20 cut the wireless connection. Details are illustrated in FIG. 9.

FIG. 7 is a sequence chart illustrating an example of messages exchanged during a wireless connection between the communication apparatus 10 and the relay apparatus 20 according to the present embodiment. In M701, the user 30 operates the communication apparatus 10 and instructs the authorization application to be executed. In M702, the communication apparatus 10 executes the authorization application unit 311 and starts the authorization of the communication apparatus 10. The authorization application unit 311 generates the communication apparatus information 1500 specifying the authorization application in the application type 1502. The authorization application unit 311 then uses the NFC communication control unit 306 to establish an NFC communication-capable state. Meanwhile, at this time, the authorization application unit 311 uses the display control unit 302 to display a message, to the user 30, indicating that the communication apparatus 10 and the relay apparatus 20 should be brought together (touched) in order to start the NFC communication.

In M703, the user 30 touches the communication apparatus 10 to the relay apparatus 20. In M704, the communication apparatus 10 and the relay apparatus 20 detect each other's NFC communication. In M705, the communication apparatus 10 sends the communication apparatus information 1500 to the relay apparatus 20 using the NFC communication control unit 306. Meanwhile, the relay apparatus 20 receives the communication apparatus information 1500 from the communication apparatus 10 using the NFC communication control unit 506. In M706, the relay apparatus 20 refers to the application type 1502 in the communication apparatus information 1500 received through the NFC communication and executes an instructed authorization application unit 513. The authorization application unit 513 generates the relay apparatus information 1600 specifying information necessary for wireless LAN communication with the relay apparatus 20 as the wireless parameters 1603. In M707, the relay apparatus 20 sends the relay apparatus information 1600 to the communication apparatus 10 using the NFC communication control unit 506. Meanwhile, the communication apparatus 10 receives the relay apparatus information 1600 from the relay apparatus 20 using the NFC communication control unit 306.

In M708, the relay apparatus 20 starts a wireless LAN communication tethering mode (called "wireless LAN tethering" hereinafter) based on the wireless parameters 1603, using the wireless LAN communication control unit 505 and the public wireless communication control unit 507. In M709, the relay apparatus 20 starts the authorization relay service using the authorization relay service control unit 510. In M710, the communication apparatus 10 starts wireless LAN communication with the relay apparatus 20 based on the wireless parameters 1603 in the received relay apparatus information 1600, using the wireless LAN communication control unit 305. In M711, the communication apparatus 10 broadcasts the presence of the communication apparatus 10 on the wireless LAN using the relay apparatus cooperative control unit 307. Specifically, the relay apparatus cooperative control unit 307 sends an SSDP: alive message on the wireless LAN.

In M712, the relay apparatus 20 receives the message broadcast by the communication apparatus 10 in M711 and discovers the communication apparatus 10, using the communication apparatus cooperative control unit 509. In M713, the relay apparatus 20 broadcasts the presence of the relay apparatus 20 on the wireless LAN and the presence of the authorization relay service, using the communication apparatus cooperative control unit 509 and the authorization relay service control unit 510. Specifically, the communication apparatus cooperative control unit 509 sends an SSDP: alive message on the wireless LAN, in the same manner as in M711. In M714, the communication apparatus 10 receives the message broadcast by the relay apparatus 20 in M713 and discovers the relay apparatus 20 and the authorization relay service, using the relay apparatus cooperative control unit 307.

FIG. 8 is a sequence chart illustrating an example of messages exchanged when carrying out authorization in the authorization system according to the present embodiment. In M801, the communication apparatus 10 sends the authorization relay request to the authorization relay service of the relay apparatus 20 using the authorization control unit 309. The relay apparatus 20 receives and detects the authorization relay request from the communication apparatus 10 using the authorization relay service control unit 510. In M802, using the display control unit 502, the relay apparatus 20 displays, in the display unit 405, an authorization type selection screen 2100 generated using the authorization application unit 513. In M803, the user 30 presses a button for one of a private mode 2101 and a group mode 2102 (FIG. 20A) as an authorization type (authorization mode), using the operating unit 406 of the relay apparatus 20.

In M804, the relay apparatus 20 generates an authorization request according to the mode selected in M803 based on the authorization relay request received from the communication apparatus 10, using the authorization relay service control unit 510. In the case of the private mode 2101, the relay apparatus 20 generates the authorization request 1800 that specifies the authorization code grant type according to OAuth 2.0. In the case of the group mode 2102, the relay apparatus 20 generates an authorization request that specifies the implicit grant type according to OAuth 2.0. Then, the relay apparatus 20 sends the generated authorization request to the authorization server 50 using the authorization control unit 512. The authorization server 50 receives the authorization request from the relay apparatus 20.

In M805, in response to the authorization request from the relay apparatus 20, the authorization server 50 issues a request for user authentication to the relay apparatus 20. Specifically, the authorization server 50 sends user authentication screen data written in HTML to the relay apparatus 20. In the present embodiment, the user authentication requested by the authorization server 50 employs HTTP digest authentication using a user ID and a password. Although the user authentication is carried out using HTTP digest authentication in the present embodiment, the invention is not limited thereto, and another authentication method such as HTTP basic authentication, OpenID, a client certificate, multifactor authentication, biometric authentication, or the like may be used instead. In M806, the relay apparatus 20 displays the received user authentication screen in the display unit 405 using the web browser control unit 508. In M807, the user 30 inputs a user ID and a password as user authentication information, using the operating unit 406 of the relay apparatus 20. In M808, the relay apparatus 20 uses the HTTP digest authentication method to send, to the authorization server 50, the user authentication information (user ID, password) input by the user 30, using the web browser control unit 508. The authorization server 50 then carries out the user authentication based on the user authentication information received from the relay apparatus 20.

When the user authentication succeeds, in M809, the authorization server 50 sends, to the relay apparatus 20, the access authority granting screen written in HTML. In M810, the relay apparatus 20 displays the received access authority granting screen in the display unit 405 using the web browser control unit 508. In M811, the user 30 presses an authorize button displayed in the access authority granting screen, using the operating unit 406 of the relay apparatus 20. In M812, the relay apparatus 20 notifies the authorization server 50 that access authority has been granted using the web browser control unit 508. In the present embodiment, the notification that the access authority has been granted is controlled by a JavaScript (registered trademark) program embedded in the access authority granting screen received from the authorization server 50. The authorization server 50 then receives the notification that the access authority has been granted from the relay apparatus 20 and determines to grant authorization to the communication apparatus 10.

In M813, the authorization server 50 sends, to the relay apparatus 20, an authorization response in response to the authorization request received in M804. The authorization response is as indicated by 1900 (FIG. 18A) in the case of the private mode and as indicated by 1910 (FIG. 18B) in the case of the group mode. The relay apparatus 20 receives the authorization response from the authorization server 50 using the authorization control unit 512. In M814, the relay apparatus 20 saves the authorization response 1910 received from the authorization server in the RAM 403, which is a storage unit, using the storage control unit 504, in the case where the group mode has been selected in M802 using the authorization control unit 512.

In M815, the relay apparatus 20 generates the authorization relay response based on the authorization response received from the authorization server 50, using the authorization relay service control unit 510. The authorization relay service control unit 510 then sends, to the communication apparatus 10 that is the transmission-source of the authorization relay request, the authorization relay response corresponding to the authorization relay request received in M801. The communication apparatus 10 receives the authorization relay response from the relay apparatus 20 using the authorization control unit 309. In M816, the communication apparatus 10 notifies the authorization relay service of the relay apparatus 20 that the authorization has succeeded, using the authorization control unit 309. The relay apparatus 20 receives the notification that the authorization has succeeded from the communication apparatus 10 using the authorization relay service control unit 510. In M817, the relay apparatus 20 displays an authorized device linking screen 2400 (FIG. 21) in the display unit 405 using the display control unit 502 in the case where the group mode has been selected in M803 using the authorization control unit 512.

FIG. 9 is a sequence chart illustrating an example of messages exchanged when a wireless connection between the communication apparatus 10 and the relay apparatus 20 is cut off according to the present embodiment. In M901, the communication apparatus 10 notifies the relay apparatus 20 that the communication apparatus 10 will exit from the wireless LAN, using the relay apparatus cooperative control unit 307. In M902, the relay apparatus 20 detects the communication apparatus 10 exiting from the wireless LAN, using the communication apparatus cooperative control unit 509. In M903, the communication apparatus 10 ends the wireless LAN communication with the relay apparatus 20 using the wireless LAN communication control unit 305. In M904, the relay apparatus 20 stops the authorization relay service using the authorization relay service control unit 510. Furthermore, the relay apparatus 20 stops the wireless LAN tethering using the wireless LAN communication control unit 505 and the public wireless communication control unit 507.

Figure 10:
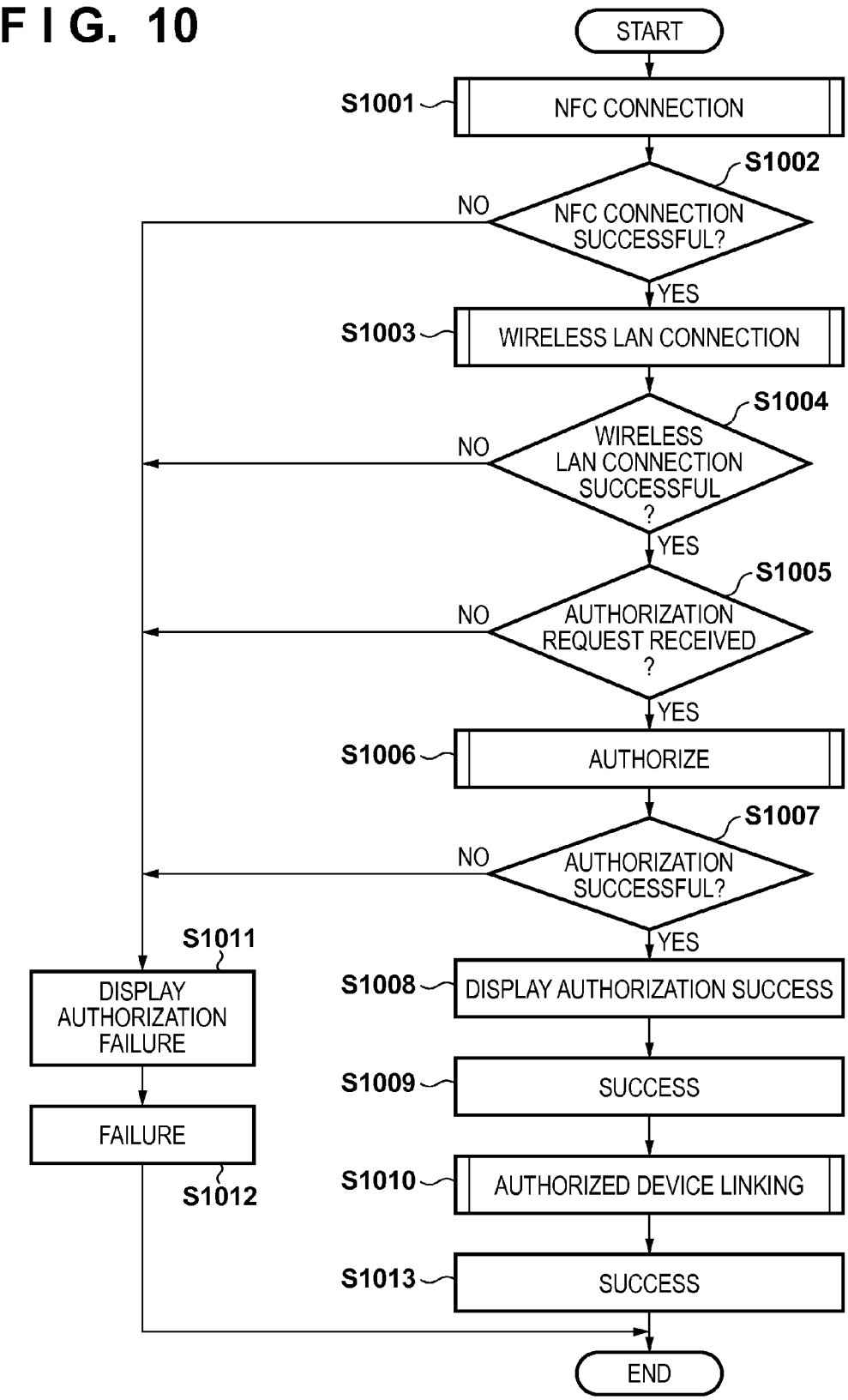
FIG. 10 is a flowchart illustrating an overall procedure for operations performed by the relay apparatus 20 according to the first embodiment.
Figure 11:
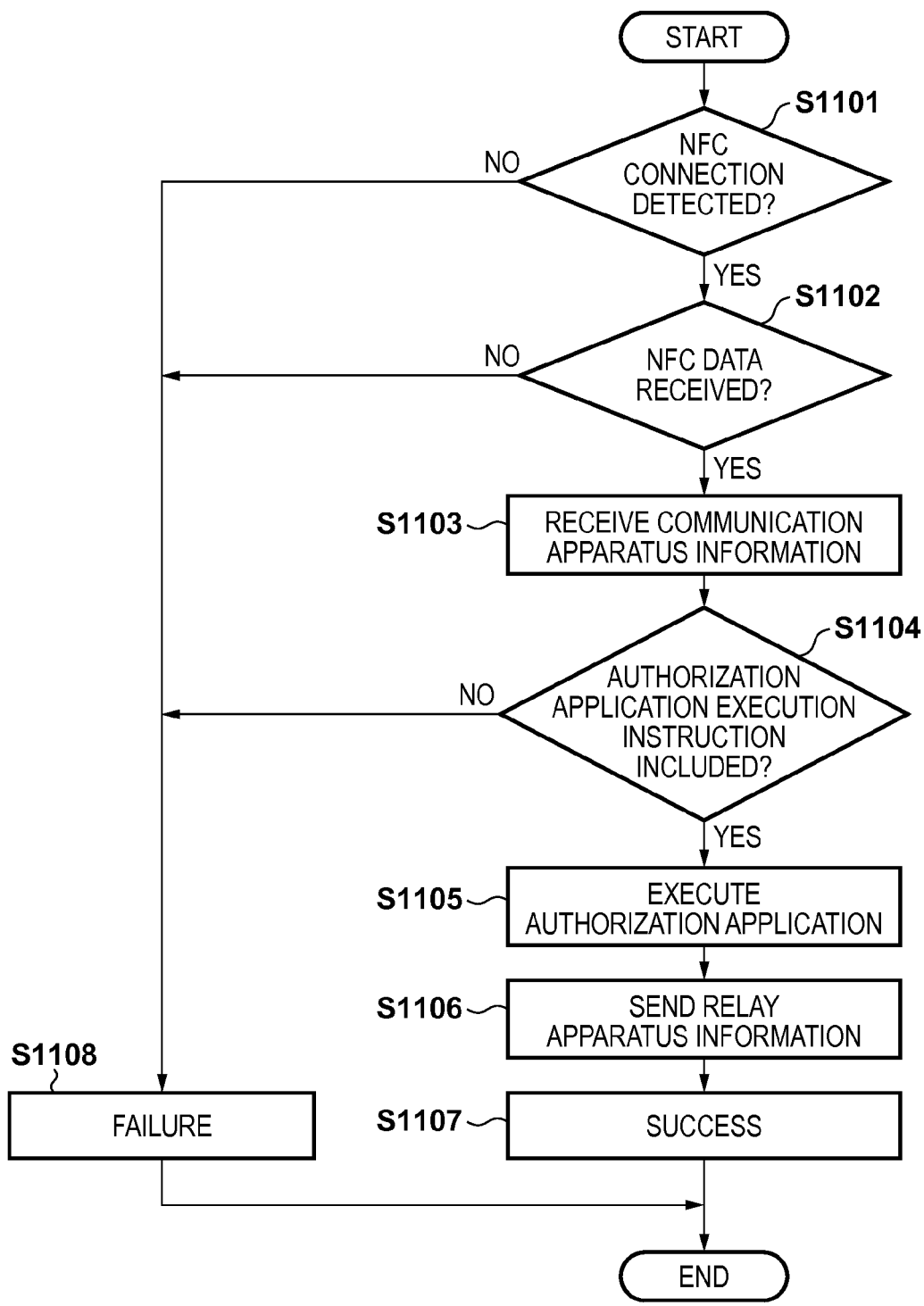
FIG. 11 is a flowchart illustrating a procedure performed by the relay apparatus 20 during NFC connection operations according to the first embodiment.
Figure 12:
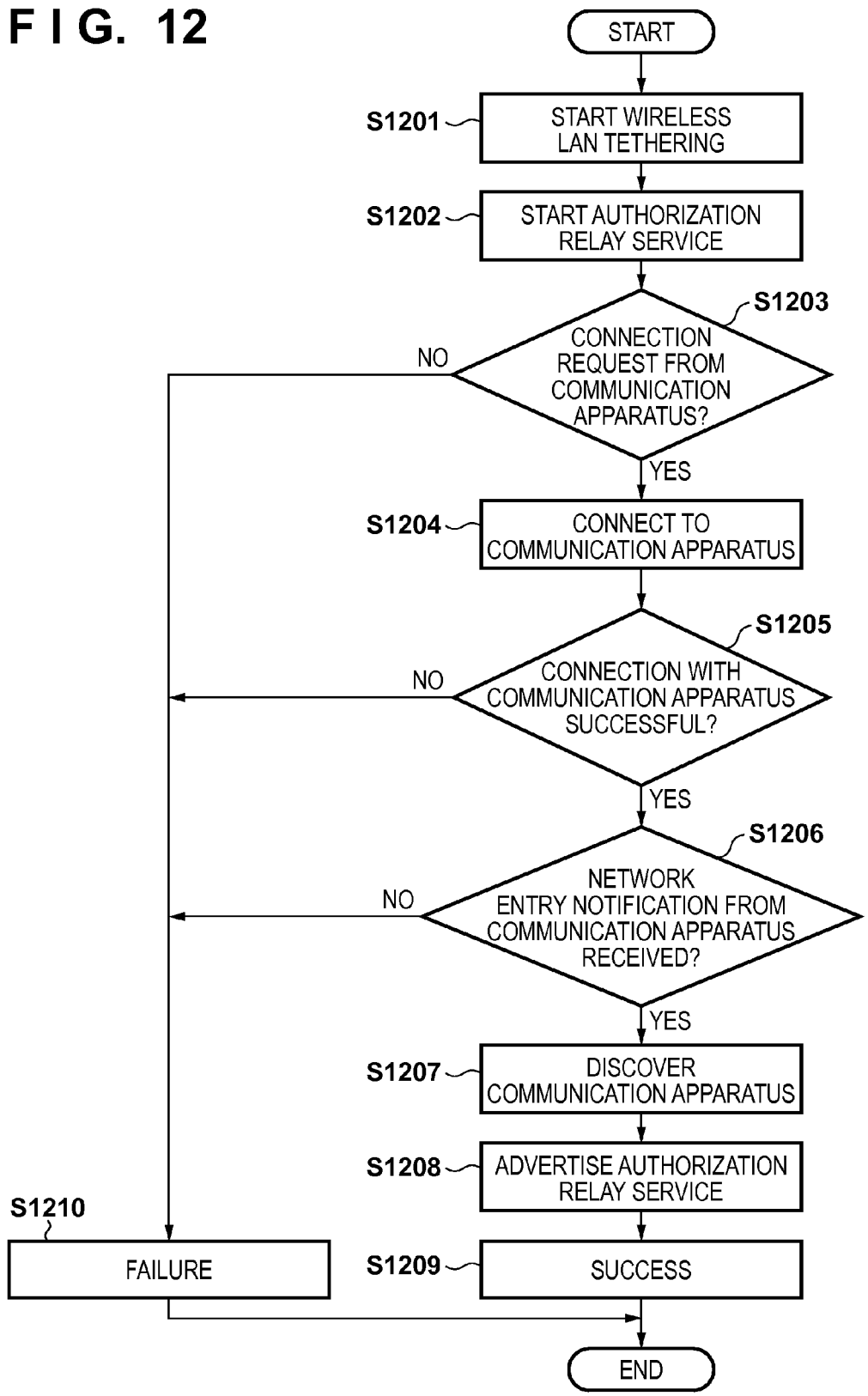
FIG. 12 is a flowchart illustrating a procedure performed by the relay apparatus 20 during wireless LAN connection operations according to the first embodiment.

FIG. 10 is a flowchart illustrating an overall procedure for operations performed by the relay apparatus 20 according to the present embodiment. In step S1001, the relay apparatus 20 carries out NFC communication with the communication apparatus 10. Details are illustrated in FIG. 11. In step S1002, the NFC communication control unit 506 determines whether or not the NFC communication with the communication apparatus 10 has succeeded. In the case where the NFC communication has succeeded (S1002; YES), the process moves to step S1003. On the other hand, in the case where the NFC communication has failed (S1002; NO), the process moves to step S1011. In step S1003, the relay apparatus 20 carries out wireless LAN communication with the communication apparatus 10. Details are illustrated in FIG. 12.

Figure 13A:
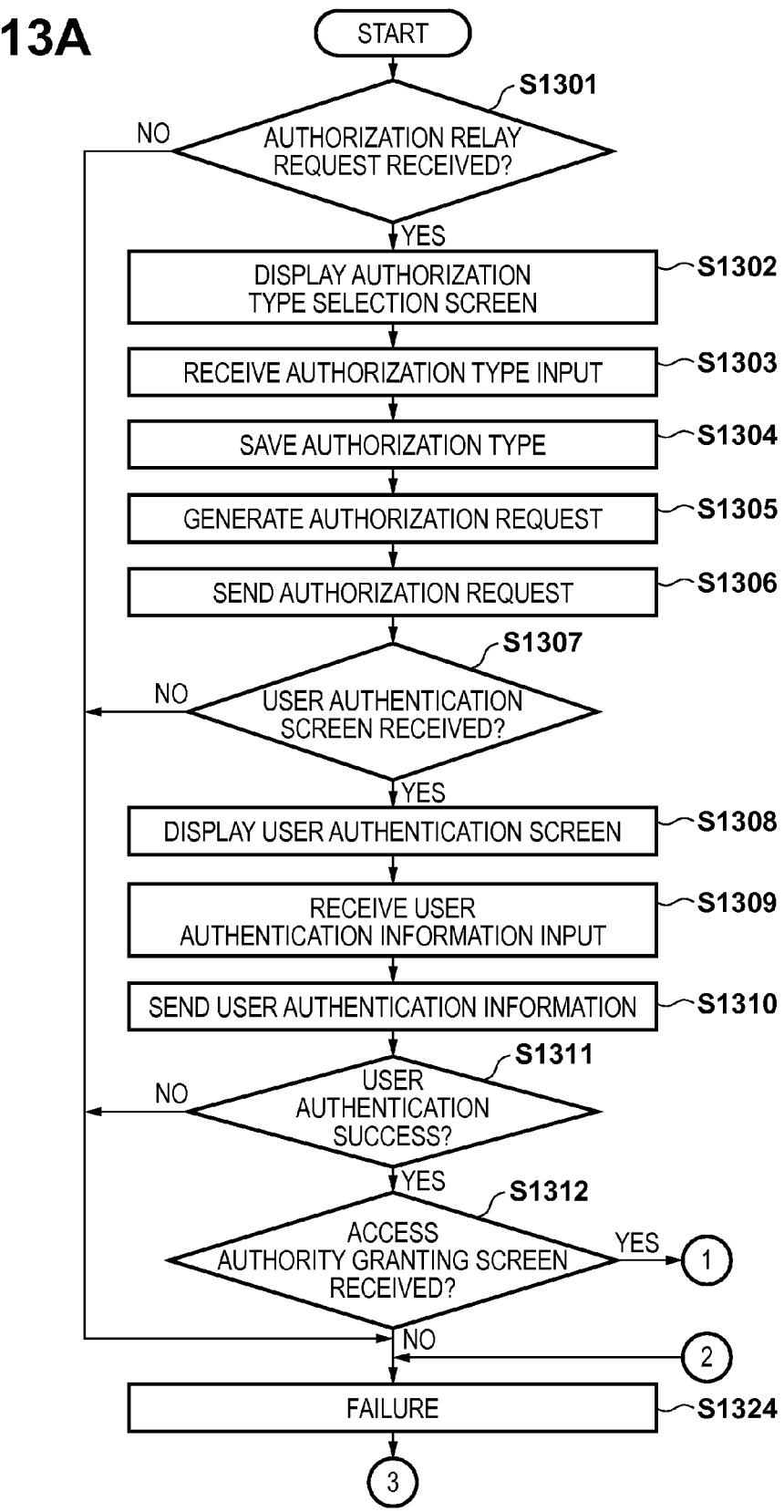
FIGS. 13A and 13B are flowcharts illustrating a procedure for authorization operations performed by the relay apparatus 20 according to the first embodiment.
Figure 13B:
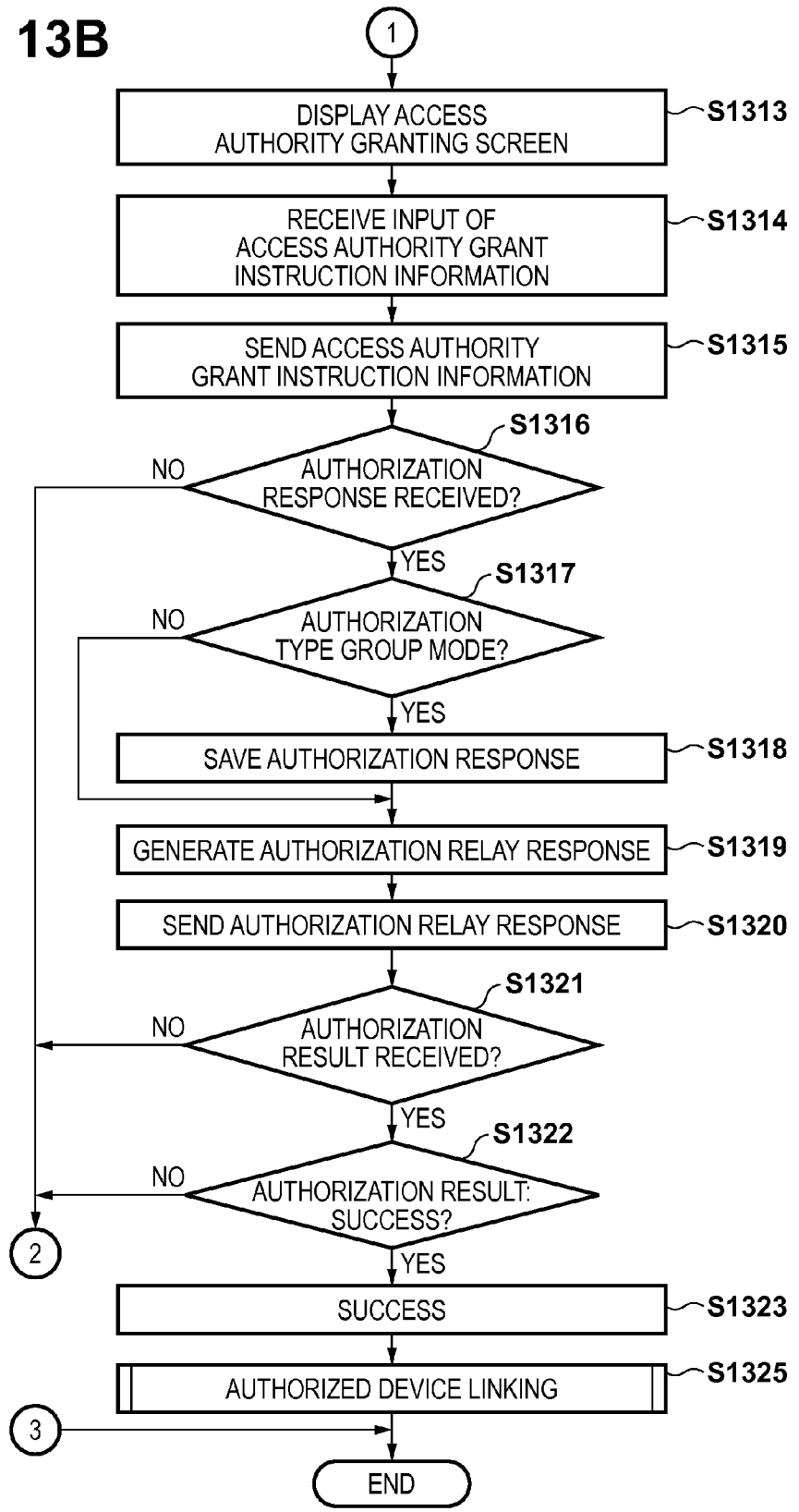

In step S1004, the wireless LAN communication control unit 505 determines whether or not the wireless LAN communication with the communication apparatus 10 has succeeded. In the case where the wireless LAN communication has succeeded (S1004; YES), the process moves to step S1005. On the other hand, in the case where the wireless LAN communication has failed (S1004; NO), the process moves to step S1011. In step S1005, the authorization relay service control unit 510 determines whether or not the authorization relay request has been received from the communication apparatus 10. In the case where the authorization relay request has been received (S1005; YES), the process moves to step S1006. On the other hand, in the case where the authorization relay request has not been received (S1005; NO), the process moves to step S1011. In step S1006, the relay apparatus 20 carries out the authorization process with the authorization server 50. Details are illustrated in FIGS. 13A and 13B.

Figure 14:
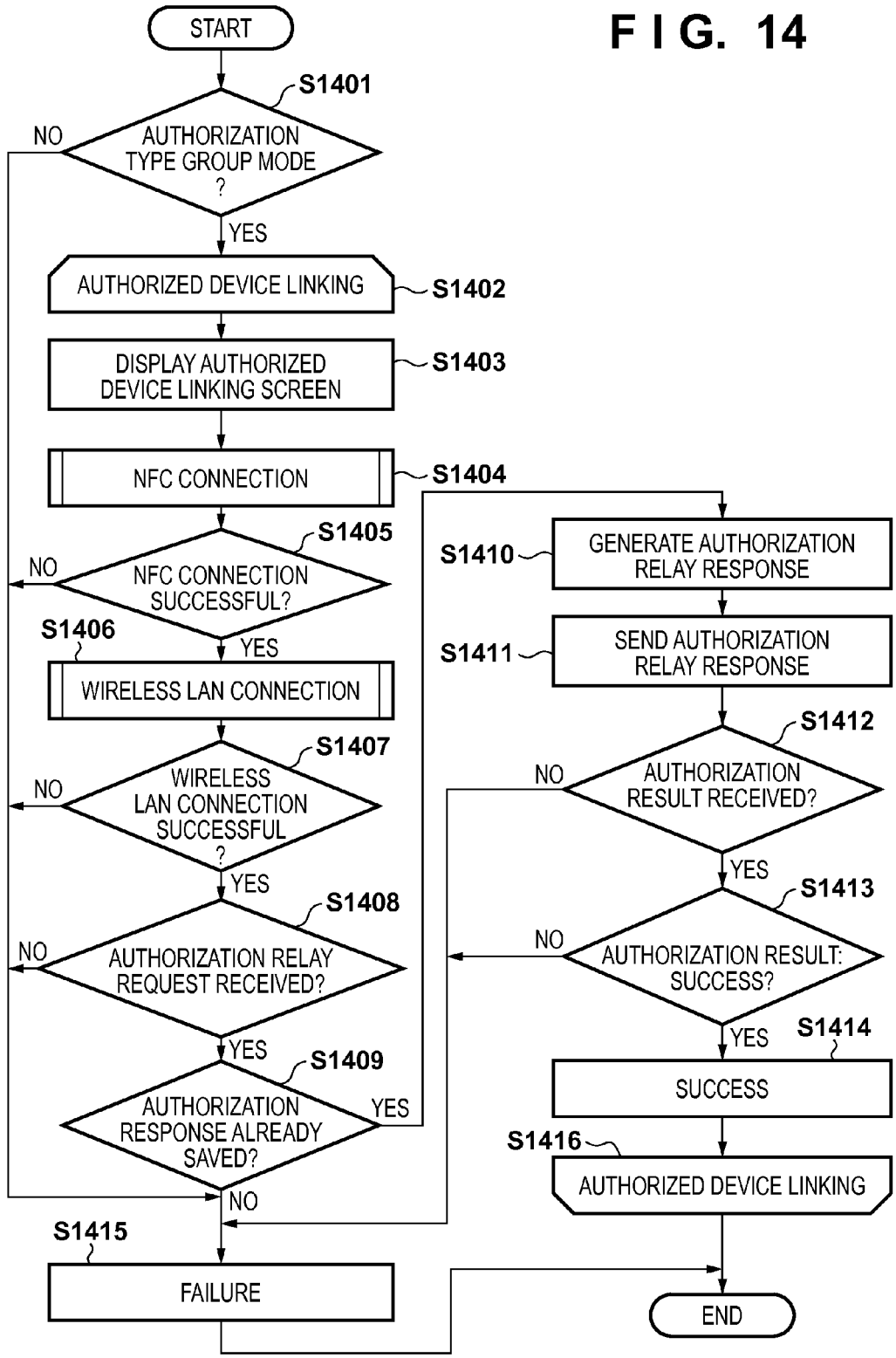
FIG. 14 is a flowchart illustrating a procedure for re-authorization operations performed by the relay apparatus 20 according to the first embodiment.

In step S1007, the authorization determination unit 511 determines whether or not authorization has succeeded. In the case where the authorization has succeeded (S1007; YES), the process moves to step S1008. On the other hand, in the case where the authorization has failed (S1007; NO), the process moves to step S1011. In step S1008, the authorization application unit 513 displays a message indicating that the authorization has succeeded in the display unit 405 using the display control unit 502. In step S1009, the control unit 501 advances the process to step S1010 assuming that the authorization has succeeded. In step S1010, the relay apparatus 20 carries out the authorization process with the communication apparatus 10. Details are illustrated in FIG. 14.

In step S1011, the authorization application unit 513 displays a message indicating that the authorization has failed in the display unit 405 using the display control unit 502. In step S1012, the control unit 501 ends the processing assuming that the authorization has failed. In step S1013, the control unit 501 ends the processing assuming that authorized device linking has succeeded.

FIG. 11 is a flowchart illustrating a procedure for operations performed by the relay apparatus 20 for an NFC connection according to the present embodiment. In step S1101, the NFC communication control unit 506 determines whether or not an NFC communication connection with the communication apparatus 10 has been detected. In the case where the NFC communication connection has been detected (S1101; YES), the process moves to step S1102. On the other hand, in the case where the NFC communication connection has not been detected (S1101; NO), the process moves to step S1108. In step S1102, the NFC communication control unit 506 determines whether or not NFC communication data has been received from the communication apparatus 10. In the case where it is determined that the NFC communication data has been received (S1102; YES), the process moves to step S1103. On the other hand, in the case where it is determined that the NFC communication data has not been received (S1102; NO), the process moves to step S1108.

In step S1103, the NFC communication control unit 506 receives the communication apparatus information 1500 from the communication apparatus 10. In step S1104, the NFC communication control unit 506 determines whether or not the authorization application is specified in the application type 1502 of the received communication apparatus information 1500. In the case where the authorization application is specified (S1104; YES), the process moves to step S1105. On the other hand, in the case where the authorization application is not specified (S1104; NO), the process moves to step S1108. In step S1105, the NFC communication control unit 506 executes the authorization application unit 513. The authorization application unit 513 generates the relay apparatus information 1600 specifying information necessary for wireless LAN communication with the relay apparatus 20 as the wireless parameters 1603. In step S1106, the NFC communication control unit 506 sends the relay apparatus information 1600 to the communication apparatus 10. In step S1107, the NFC communication control unit 506 ends the processing, assuming that the NFC communication with the communication apparatus 10 has succeeded. In step S1108, the NFC communication control unit 506 ends the processing, assuming that the NFC communication with the communication apparatus 10 has failed.

FIG. 12 is a flowchart illustrating a procedure for operations performed by the relay apparatus 20 for a wireless LAN connection according to the present embodiment. In step S1201, the wireless LAN communication control unit 505 and the public wireless communication control unit 507 start wireless LAN tethering. In step S1202, the authorization relay service control unit 510 starts the authorization relay service. In step S1203, the wireless LAN communication control unit 505 determines whether or not a wireless LAN communication connection request has been received from the communication apparatus 10. In the case where it is determined that the request has been received (S1203; YES), the process moves to step S1204. On the other hand, in the case where it is determined that the request has not been received (S1203; NO), the process moves to step S1210.

In step S1204, the wireless LAN communication control unit 505 starts the wireless LAN communication connection with the communication apparatus 10. In step S1205, the wireless LAN communication control unit 505 determines whether or not the wireless LAN communication connection with the communication apparatus 10 has succeeded. In the case where the connection has succeeded (S1205; YES), the process moves to step S1206. On the other hand, in the case where the connection has failed (S1205; NO), the process moves to step S1210. In step S1206, the communication apparatus cooperative control unit 509 determines whether or not a message providing a notification that the communication apparatus 10 is present on the wireless LAN has been received from the communication apparatus 10. In the case where it is determined that the message has been received (S1206; YES), the process moves to step S1207, whereas in the case where it is determined that the message has not been received (S1206; NO), the process moves to step S1210. In step S1207, the communication apparatus cooperative control unit 509 discovers the communication apparatus 10 on the wireless LAN.

In step S1208, the communication apparatus cooperative control unit 509 and the authorization relay service control unit 510 broadcast the presence of the relay apparatus 20 on the wireless LAN and the presence of the authorization relay service. In step S1209, the wireless LAN communication control unit 505 determines to end the processing, assuming that the wireless LAN communication with the communication apparatus 10 has succeeded. In step S1210, the wireless LAN communication control unit 505 determines to end the processing, assuming that the wireless LAN communication with the communication apparatus 10 has failed.

Figure 20A:
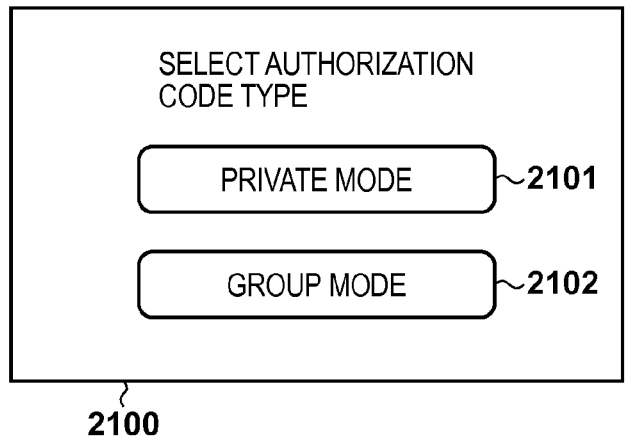
FIGS. 20A-20C are diagrams illustrating examples of display screens according to the first embodiment.

FIGS. 13A and 13B are flowcharts illustrating a procedure for authorization operations performed by the relay apparatus 20 according to the present embodiment. In step S1301, the authorization relay service control unit 510 determines whether or not the authorization relay request based on the authorization relay request information illustrated in FIG. 16 has been received from the communication apparatus 10. In the case where it is determined that the request has been received (S1301; YES), the process moves to step S1302, whereas in the case where it is determined that the request has not been received (S1301; NO), the process moves to step S1324. In step S1302, the authorization control unit 512 displays the authorization type selection screen 2100 in the display unit 405 using the display control unit 502. In step S1303, the user 30 selects the authorization type using the operating unit 406 of the relay apparatus 20. The private mode 2101 is an authorization code type according to OAuth 2.0, whereas the group mode 2102 is an implicit type according to OAuth 2.0 (FIG. 20A).

In step S1304, the authorization control unit 512 stores the authorization type selected in step S1303 in the RAM 403 using the storage control unit 504. In step S1305, the authorization relay service control unit 510 generates the authorization request based on the authorization request information illustrated in FIG. 17, using the authorization relay request received from the communication apparatus 10. In the present embodiment, the authorization relay service control unit 510 specifies "code" in 1801 of the authorization request information in the case where the authorization type selected in step S1303 is the private mode. In the case where the authorization type is the group mode, the authorization relay service control unit 510 specifies "token" for 1801 in the authorization request information, and specifies the same values as those of 1702-1704 of the authorization relay request information received in step S1301, in 1802-1804 of the authorization request information. Furthermore, the authorization relay service control unit 510 specifies a URI (Unique Resource Identifier) indicating the authorization application unit 513 of the relay apparatus 20 in redirect_uri 1805.

In step S1306, the authorization control unit 512 sends the generated authorization request to the authorization server 50. In step S1307, the authorization control unit 512 determines whether or not the user authentication screen data written in HTML has been received from the authorization server 50. In the case where it is determined that the data has been received (S1307; YES), the process moves to step S1308, whereas in the case where it is determined that the data has not been received (S1307; NO), the process moves to step S1324. In step S1308, the web browser control unit 508 displays the received user authentication screen in the display unit 405. In step S1309, the web browser control unit 508 receives the user authentication information (user ID, password) input by the user 30. In step S1310, the web browser control unit 508 sends the user authentication information (user ID, password) input by the user 30 to the authorization server 50, using the HTTP digest authentication method.

In step S1311, the web browser control unit 508 determines whether or not the user authentication has succeeded. In the case where the user authentication has succeeded (S1311; YES), the process moves to step S1312, whereas in the case where the user authentication has failed (S1311; NO), the process moves to step S1324. In step S1312, the web browser control unit 508 determines whether or not the access authority granting screen data written in HTML has been received from the authorization server 50. In the case where it is determined that the data has been received (S1312; YES), the process moves to step S1313, whereas in the case where it is determined that the data has not been received (S1312; NO), the process moves to step S1324. In step S1313, the web browser control unit 508 displays the received access authority granting screen 2300 in the display unit 405. In step S1314, the web browser control unit 508 receives access authority granting instruction information input by the user 30. Specifically, the web browser control unit 508 receives information corresponding to an authorize button or a deny button, pressed by the user 30, displayed in the access authority granting screen.

In step S1315, the web browser control unit 508 sends the access authority granting instruction information to the authorization server 50. In step S1316, the authorization control unit 512 determines whether or not the authorization response based on the authorization response information illustrated in FIG. 18 has been received from the authorization server 50 via the web browser control unit 508. In the case where the response has been received (S1316; YES), the process moves to step S1317, whereas in the case where the response has not been received (S1316; NO), the process moves to step S1324. In step S1317, the authorization control unit 512 determines whether the authorization type is the group mode. In the case of the group mode (S1317; YES), the process moves to step S1318. On the other hand, in the case where the mode is not the group mode (S1317; NO), the process moves to step S1319. In step S1318, the storage control unit 504 saves the authorization response in the RAM 403.

In step S1319, the authorization relay service control unit 510 generates the authorization relay response based on the authorization relay response information 2000 or 2010 illustrated in FIG. 19, using the authorization response received from the authorization server 50. In the case where the authorization type is the private mode, in the present embodiment, the authorization relay service control unit 510 specifies the same values as those of 1901-1902 of the authorization response information received in step S1316, in 2001-2002 of the authorization relay response information. Furthermore, the authorization relay service control unit 510 specifies the same value as that of redirect_uri 1805 of the authorization request 1800, in the redirect_uri 2003. In the case where the authorization type is the group mode, in the present embodiment, the authorization relay service control unit 510 specifies the same values as those of 1911, 1912, and 1914 of the authorization response information received in step S1316, in 2011-2013 of the authorization relay response information.

In step S1320, the authorization relay service control unit 510 sends the authorization relay response generated in step S1319 to the communication apparatus 10. In step S1321, the authorization relay service control unit 510 determines whether or not an authorization result has been received from the communication apparatus 10. In the case where it is determined that the result has been received (S1321; YES), the process moves to step S1322, whereas in the case where it is determined that the result has not been received (S1321; NO), the process moves to step S1324. In step S1322, the authorization relay service control unit 510 determines whether or not the authorization result received from the communication apparatus 10 indicates that the authorization is successful. In the case where it is determined that the authorization result indicates that the authorization is successful (S1322; YES), the process moves to step S1323, whereas in the case where it is determined that the authorization result indicates that the authorization has failed (S1322; NO), the process moves to step S1324. In step S1323, the authorization control unit 512 ends the processing assuming that the authorization has succeeded. In step S1324, the authorization control unit 512 ends the processing assuming that the authorization has failed. In step S1325, the authorization control unit 512 carries out authorized device linking. Details are illustrated in FIG. 14.

FIG. 14 is a flowchart illustrating a procedure for operations through which the relay apparatus 20 performs authorized device linking with a given communication apparatus 10 in the case where the authorization type is the group mode, according to the present embodiment. In step S1901, the authorization determination unit 308 determines whether or not the authorization type is the group mode. In the case where the authorization type is the group mode (S1401; YES), the process moves to step S1402, whereas in the case where the authorization type is not the group mode (S1401; NO), the process moves to step S1415. In step S1402, the relay apparatus 20 continues the authorized device linking process until a process between steps S1402 and S1416 fails or until a message indicating that the authorization process is to be ended is received from the authorization control unit 512 or the authorization application unit 513.

In step S1403, the authorization control unit 512 displays the authorized device linking screen 2400 (FIG. 21) in the display unit 405 using the display control unit 502. In step S1404, the relay apparatus 20 carries out NFC communication with the communication apparatus 10. Details of step S1404 are as illustrated in FIG. 11. In step S1405, the NFC communication control unit 506 determines whether or not the NFC communication with the communication apparatus 10 has succeeded. In the case where the NFC communication has succeeded (S1405; YES), the process moves to step S1406. On the other hand, in the case where the NFC communication has failed (S1405; NO), the process moves to step S1415. In step S1406, the relay apparatus 20 carries out wireless LAN communication with the communication apparatus 10. Details of the processing of step S1406 are as illustrated in FIG. 12.

In step S1407, the wireless LAN communication control unit 505 determines whether or not the wireless LAN communication with the communication apparatus 10 has succeeded. In the case where the wireless LAN communication has succeeded (S1407; YES), the process moves to step S1408. On the other hand, in the case where the wireless LAN communication has failed (S1407; NO), the process moves to step S1415. In step S1408, the authorization relay service control unit 510 determines whether or not the authorization relay request has been received from the communication apparatus 10 and detected. In the case where it is determined that the authorization relay request has been received (S1408; YES), the process moves to step S1409. On the other hand, in the case where it is determined that the authorization relay request has not been received (S1408; NO), the process moves to step S1415. In step S1409, the authorization control unit 512 determines whether or not the authorization response is saved in the RAM 403. In the case where it is determined that the response is saved (S1409; YES), the process moves to step S1410. On the other hand, in the case where it is determined that the authorization relay request has not been received (S1409; NO), the process moves to step S1415.

In step S1410, the authorization relay service control unit 510 generates the authorization relay response based on the authorization relay response 2010 illustrated in FIG. 19 using the authorization response saved in the RAM 403. In the present embodiment, the authorization relay service control unit 510 sets the authorization relay response received in step S1316 for the authorization relay responses 2011-2013. In other words, the authorization relay service control unit 510 specifies the same value as 1911 for 2011, specifies the same value as 1912 for 2012, and specifies the same value as 1914 for 2013. In step S1411, the authorization relay service control unit 510 sends the authorization relay response generated in step S1410 to the communication apparatus 10 that is the transmission-source of the authorization relay response. In step S1412, the authorization relay service control unit 510 determines whether or not an authorization result has been received from the communication apparatus 10. In the case where it is determined that the result has been received (S1412; YES), the process moves to step S1413, whereas in the case where it is determined that the result has not been received (S1412; NO), the process moves to step S1415.

In step S1413, the authorization relay service control unit 510 determines whether or not the authorization result received from the communication apparatus 10 indicates that the authorization is successful. In the case where it is determined that the authorization result indicates that the authorization is successful (S1413; YES), the process moves to step S1414, whereas in the case where it is determined that the authorization result indicates that the authorization has failed (S1413; NO), the process moves to step S1415. In step S1414, the authorization control unit 512 ends the processing assuming that the authorization has succeeded. In step S1415, the authorization control unit 512 ends the processing assuming that the authorization has failed.

Figure 16:
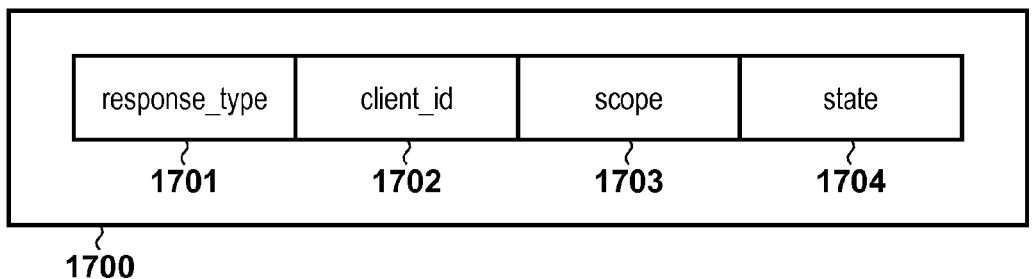
FIG. 16 is a diagram illustrating an example of the data structure of authorization relay request information according to the first embodiment.

FIG. 16 is a diagram illustrating an example of the data structure of the authorization relay request information according to the present embodiment. The authorization relay request information 1700 corresponds to the entirety of the parameter information necessary for the authorization relay request according to the present embodiment. response_type 1701 is an authorization grant type according to OAuth 2.0. In the present embodiment, the response_type 1701 specifies "code", which is a value indicating the authorization code grant type, in the case where the authorization type is the private mode. In the case where the authorization type is the group mode, the response_type 1701 specifies "token", which is a value indicating the implicit grant type. client_id 1702 is the client type according to OAuth 2.0. In the present embodiment, the client_id 1702 specifies a device ID 2001 of the communication apparatus 10. scope 1703 indicates an access authority range according to OAuth 2.0. state 1704 is a random value for maintaining a state according to OAuth 2.0.

Figure 17:
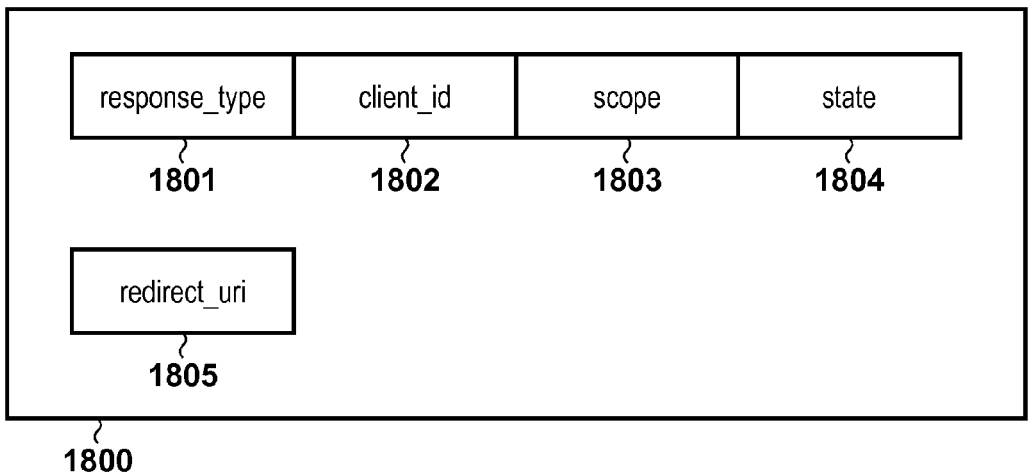
FIG. 17 is a diagram illustrating an example of the data structure of authorization request information according to the first embodiment.

FIG. 17 is a diagram illustrating an example of the data structure of the authorization request information according to the present embodiment. Note that with respect to the authorization request information, descriptions of data items that are the same as in the authorization relay request information illustrated in FIG. 16 will be omitted, and only the differences will be mentioned. The authorization request 1800 corresponds to the entirety of the parameter information necessary for the authorization request according to the present embodiment. scope 1803 is the same as the scope 1703 illustrated in FIG. 16. In the present embodiment, the authorization application unit 513 uses the same value for the scope 1803 as for the scope 1703. This means that the relay apparatus 20 issues, to the authorization server 50, a request for the same access authority range as requested by the communication apparatus 10. On the other hand, the authorization application unit 513 may use a different value for the scope 1803 from the value of the scope 1703. This means that the relay apparatus 20 issues, to the authorization server 50, a request for a different access authority range from the access authority range requested by the communication apparatus 10. The redirect_uri 1805 is a redirect endpoint according to OAuth 2.0. In the present embodiment, the redirect_uri 1805 specifies a URI indicating the authorization application unit 513 of the relay apparatus 20. Through this, when the authorization response is received from the authorization server 50, the relay apparatus 20 can pass the data of the authorization response to the authorization application unit 513.

Figure 18A:
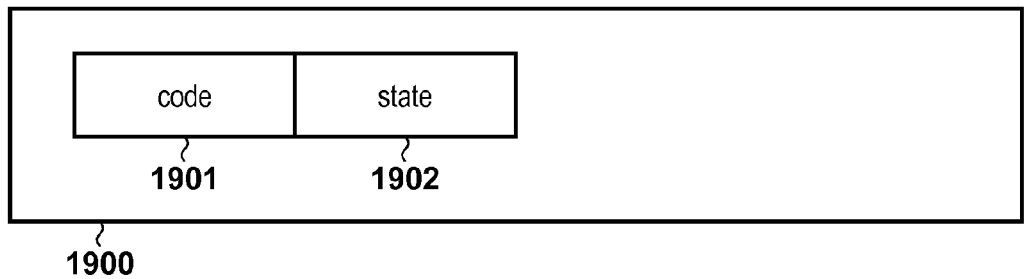
FIGS. 18A and 18B are diagrams illustrating an example of the data structure of authorization response information according to the first embodiment.
Figure 18B:
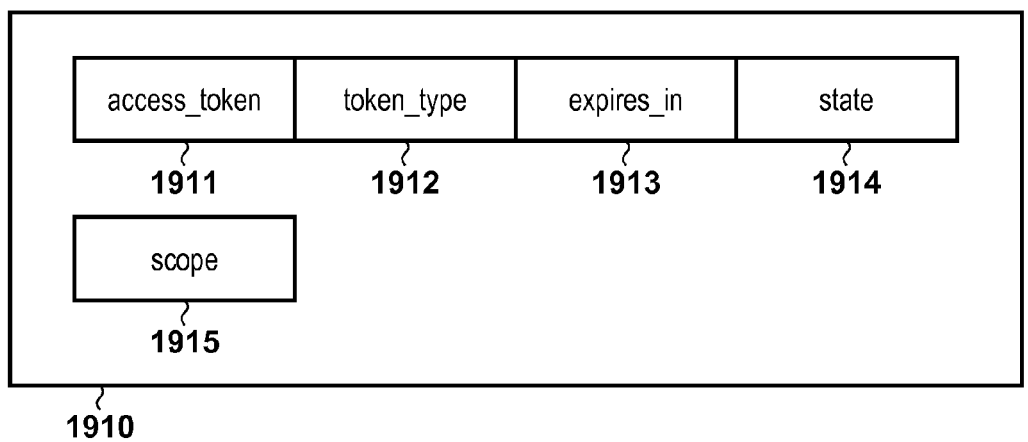

FIGS. 18A-18B are diagrams illustrating an example of the data structure of the authorization response information according to the present embodiment. Note that with respect to the authorization response information, descriptions of data items that are the same as those in the various types of information illustrated in FIGS. 16-17 will be omitted, and only the differences will be mentioned. The authorization response information 1900 illustrated in FIG. 18A corresponds to the entirety of the parameter information necessary for the authorization response in which the authorization type is the private mode, according to the present embodiment. code 1901 is an authorization code according to OAuth 2.0. The authorization response 1910 illustrated in FIG. 18B corresponds to the entirety of the parameter information necessary for the authorization response in which the authorization type is the group mode, according to the present embodiment. access_token 1911 is an access token according to OAuth 2.0. token_type 1912 is an access token type according to OAuth 2.0. expires_in 1913 is the expiration date of the access token according to OAuth 2.0.

Figure 19A:
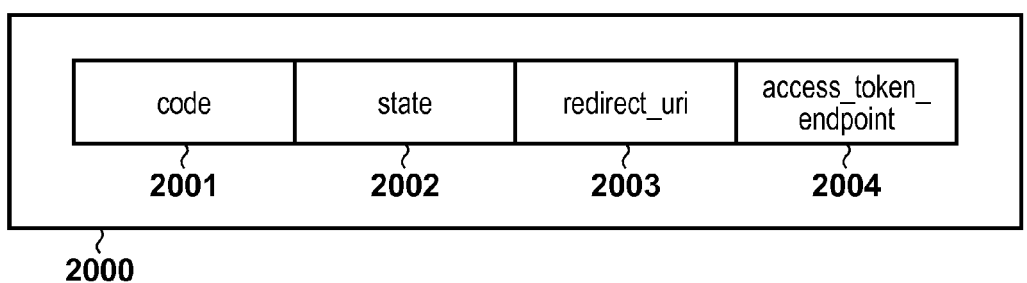
FIGS. 19A and 19B are diagrams illustrating an example of the data structure of authorization relay response information according to the first embodiment.
Figure 19B:
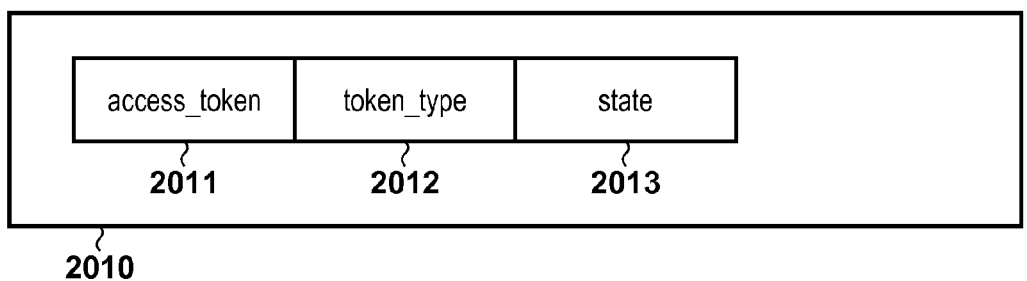

FIGS. 19A-19B are diagrams illustrating an example of the data structure of the authorization relay response information according to the present embodiment. Note that with respect to the authorization relay response information, descriptions of data items that are the same as those in the various types of information illustrated in FIGS. 16-18 will be omitted, and only the differences will be mentioned. The authorization relay response information 2000 illustrated in FIG. 19A corresponds to the entirety of the parameter information necessary for the authorization relay response in which the authorization type is the private mode, according to the present embodiment. access_token_endpoint 2004 is an endpoint that receives the access token request in the authorization server 50, or in other words, is a URI. The authorization relay response information 2000 illustrated in FIG. 19B corresponds to the entirety of the parameter information necessary for the authorization relay response in which the authorization type is the group mode, according to the present embodiment.

FIG. 20A is a diagram illustrating an example of an authorization type selection screen according to the present embodiment. The authorization type selection screen 2100 corresponds to an authorization type selection screen according to the present embodiment. The authorization type selection screen 2100 is displayed in the display unit 405 of the relay apparatus 20 by the display control unit 502. The private mode 2101 corresponds to a button indicating the authorization code grant type according to OAuth 2.0. The group mode 2102 corresponds to a button indicating the implicit type according to OAuth 2.0.

Figure 20B:
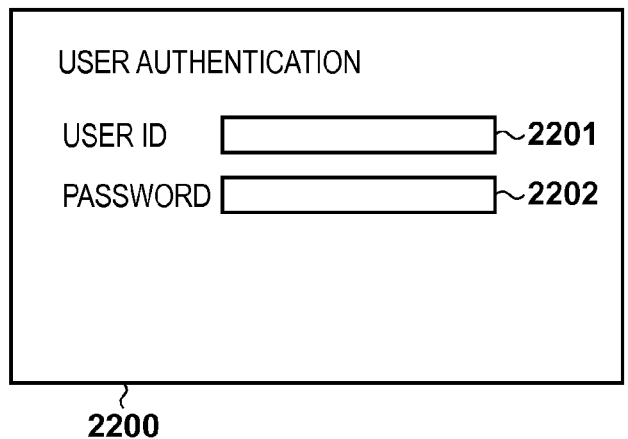

FIG. 20B is a diagram illustrating an example of the user authentication screen according to the present embodiment. A user authentication screen 2200 corresponds to the user authentication screen according to the present embodiment. The user authentication screen 2200 is written in HTML, and is displayed in the display unit 405 of the relay apparatus 20 by the web browser control unit 508. User ID 2201 indicates a text field into which the user ID is input. Password 2202 indicates a text field into which the user password is input.

Figure 20C:
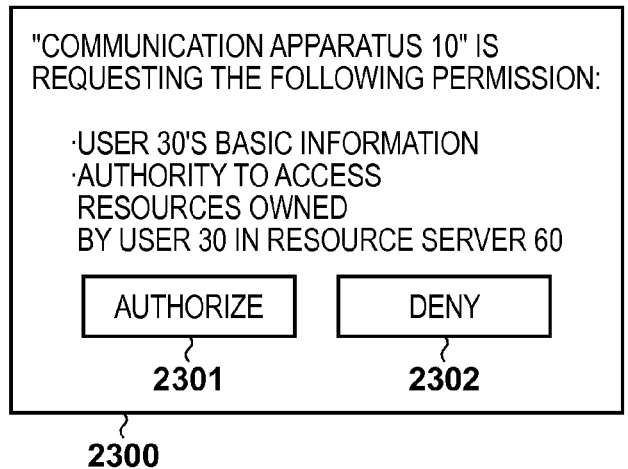

FIG. 20C is a diagram illustrating an example of the access authority granting screen according to the present embodiment. The access authority granting screen 2300 corresponds to the access authority granting screen according to the present embodiment. The access authority granting screen 2300 is written in HTML, and is displayed in the display unit 405 of the relay apparatus 20 by the web browser control unit 508. An authorize button 2301 is a button indicating that access authority is to be granted to an authorization target (the communication apparatus 10, in the present embodiment). A deny button 2302 is a button indicating that access authority is not to be granted to an authorization target (the communication apparatus 10, in the present embodiment).

Figure 21A:
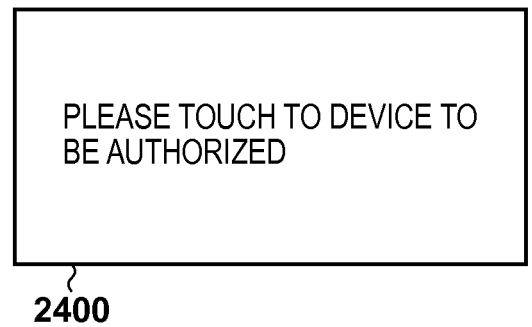
FIGS. 21A-21C are diagrams illustrating examples of authorized device linking screens according to the first embodiment.
Figure 21B:
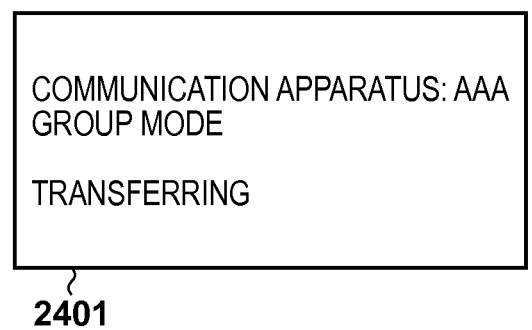
Figure 21C:
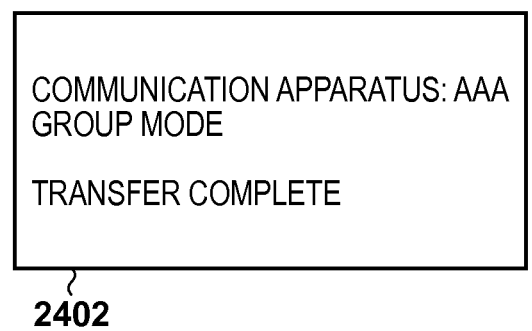

FIGS. 21A-21C illustrate authorized device linking screens 2400-2402 according to the present embodiment. The authorized device linking screen 2400 illustrated in FIG. 21A is displayed in the display unit 405 by the display control unit 502 of the relay apparatus 20 prior to linking to an authorized device (the communication apparatus 10). The authorized device linking screen 2400 is a screen indicating that authorization can be carried out. An authorized device linking screen 2401 illustrated in FIG. 21B is displayed in the display unit 405 by the display control unit 502 after the linking with the authorized device, up until the authorization relay response is sent to the communication apparatus 10 and the authorization result is sent from the communication apparatus 10. An authorized device linking screen 2402 illustrated in FIG. 21C is displayed in the display unit 405 by the display control unit 502 after the linking with the authorized device, when the authorization relay response has been sent to the communication apparatus 10 and the authorization result has been sent from the communication apparatus 10.

As described thus far, the communication apparatus 10 sends the authorization relay request to the relay apparatus 20 using the NFC communication function and the wireless LAN function of the communication apparatus 10 and the relay apparatus 20. After receiving the authorization relay request, the relay apparatus 20 displays the authorization type selection screen 2100 in the display unit 405. The relay apparatus 20 then generates the authorization request for the authorization type selected by the user 30 through the authorization type selection screen and sends the authorization request to the authorization server 50. The relay apparatus 20 then displays, in the display unit 405, the user authentication screen data and the access authority granting screen data written in HTML from the authorization server 50, using the web browser control unit 508. The relay apparatus 20 sends an input from the user 30 to the authorization server 50, and receives the authorization response from the authorization server 50. The relay apparatus 20 saves the authorization response, with the user 30 having selected the group mode as the authorization type as a condition. Thereafter, the relay apparatus 20 sends the authorization relay response based on the authorization response to the communication apparatus 10. After receiving the authorization relay response, the communication apparatus 10 sends the authorization result to the relay apparatus 20. In the case where the authorization succeeds and the authorization type is the group mode, the authorized device linking screen 2400 can be displayed and the user 30 can be prompted to link to an authorized device.

When the user 30 has made a wireless LAN connection with the communication apparatus 10 through the NFC communication function, the authorization request is obtained from the NFC-linked communication apparatus 10, the authorization relay response is generated based on the saved authorization response, and the authorization relay response is sent to the communication apparatus 10. Through this, when granting the same access authority to multiple devices, the authorization process can be carried out without carrying out the user authentication and the access authority granting processes with the authorization server 50 each time, thus increasing the convenience for the user.

The authorization response saved in the relay apparatus 20 is deleted when the authorization application unit 513 of the relay apparatus 20 is terminated and when the authorization process is started with a new communication apparatus 10, but it is also possible to add a function for deleting the authorization response to the authorization application and delete the response at a predetermined point in time. Although it is possible to terminate the authorization application in order to end the authorized device linking process during operations when the authorized device linking screen 2400 is being displayed, it is also possible to provide an end button in the authorized device linking screen and enable the user 30 to explicitly end the process.

Meanwhile, a situation can be considered where in the relay apparatus 20, it takes time from when the authorization type selection screen 2100 is displayed to when the authorization response is obtained from the authorization server 50 after the user authentication and access authority granting processes have been carried out with the authorization server 50. In light of such a situation, it is possible to display, in the display unit 405, a screen notifying the user that the authorization response is being received.

In addition, it is also possible to use the authorization type set for the authorization relay request by the communication apparatus 10 as-is, without displaying the authorization type selection screen 2100. Thereafter, the relay apparatus 20 generates and sends the authorization relay response based on the authorization response received from the authorization server 50 to the communication apparatus 10.

Furthermore, although the authorization relay request and the authorization relay response are sent and received between the communication apparatus 10 and the relay apparatus 20 through wireless LAN communication in the present embodiment, the invention is not limited thereto. It should be noted here that the same effects can be achieved even if another communication method, such as NFC, BT, BT-LE, ZigBee, or the like, is used. The foregoing has described an embodiment of the present invention.

Second Embodiment

The present embodiment describes a case in which the user 30 operates the relay apparatus 20 and starts the authorization process after launching the authorization application unit 513. In the present embodiment, descriptions of items that are the same as those in the first embodiment will be omitted, and only the differences will be mentioned.

Figure 22:
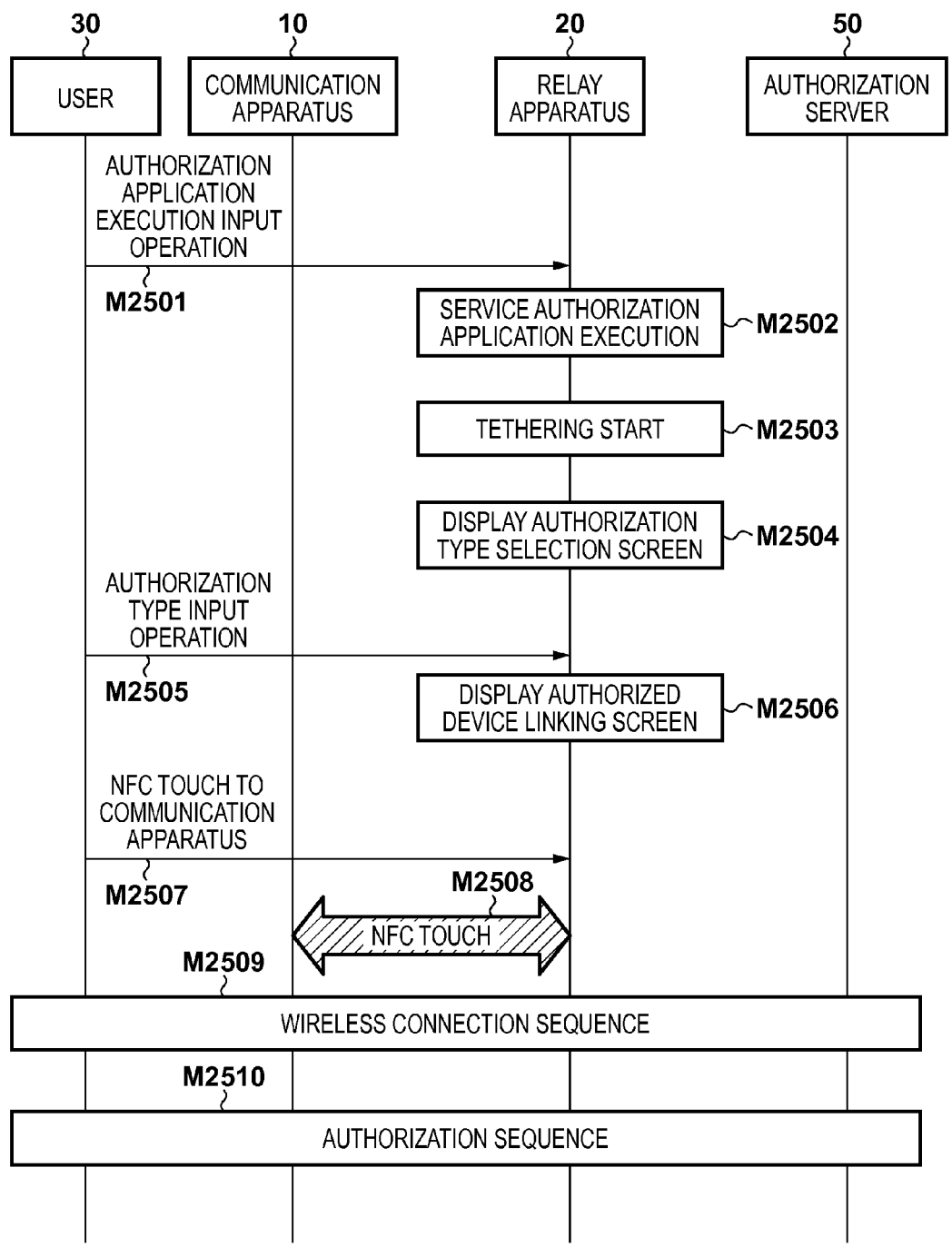
FIG. 22 is a sequence chart illustrating an example of messages exchanged in an authorization sequence (a private mode) according to a second embodiment.

FIG. 22 is a sequence chart illustrating an example of messages exchanged when the communication apparatus 10 and the relay apparatus 20 carry out NFC communication and perform the authorization process when the private mode is selected in the authorized device linking screen 2400, according to the present embodiment. Note that FIG. 22 corresponds to FIG. 8, which indicates the authorization sequence according to the first embodiment.

In M2501, the user 30 operates the relay apparatus 20 and instructs the authorization application to be executed. In M2502, the relay apparatus 20 executes the authorization application unit 513. In M2503, the wireless LAN communication control unit 505 and the public wireless communication control unit 507 start wireless LAN tethering. In M2504, the authorization control unit 512 displays the authorization type selection screen 2100 in the display unit 405 using the display control unit 502. In M2505, the user 30 selects the authorization type using the operating unit 406 of the relay apparatus 20. The private mode 2101 is an authorization code according to OAuth 2.0, whereas the group mode 2102 is implicit according to OAuth 2.0. In the present sequence, the user 30 selects the private mode.

In M2506, in the case where the private mode has been selected in M2505, the client_id 1802 is required when sending the authorization request 1800 to the authorization server 50. As such, the user 30 is prompted to make an NFC touch with the communication apparatus 10, and thus the authorized device linking screen 2400 is displayed. In M2507, the user 30 touches the relay apparatus 20 to the communication apparatus 10. In M2508, the communication apparatus 10 and the relay apparatus 20 detect each other's NFC communication. In M2509, the communication apparatus 10 and the relay apparatus 20 connect wirelessly. Details of the processing of M2509 are as illustrated in FIG. 7. In M2510, the communication apparatus 10, the relay apparatus 20, and the authorization server 50 carry out authorization. Details of the processing of M2510 are as illustrated in FIG. 8.

FIG. 23 is a sequence chart illustrating an example of messages exchanged when the communication apparatus 10 and the relay apparatus 20 carry out NFC communication and perform the authorization process when the group mode is selected in the authorized device linking screen 2400, according to the present embodiment. Note that FIG. 23 corresponds to FIG. 8, which indicates the authorization sequence according to the first embodiment.

M2601 to M2605 carry out the same operations as those in M2501 to M2505. In M2606, the communication apparatus 10, the relay apparatus 20, and the authorization server 50 carry out authorization. M804 to M814, illustrated in FIG. 8, are carried out. In M2607, in the case where the group mode has been selected in M2605, it is necessary to send the authorization response 1910 received from the authorization server 50 to the communication apparatus 10. As such, the user 30 is prompted to make an NFC touch with the communication apparatus 10, and thus the authorized device linking screen 2400 is displayed. In M2608, the user 30 touches the relay apparatus 20 to the communication apparatus 10. In M2609, the communication apparatus 10 and the relay apparatus 20 detect each other's NFC communication. In M2610, the communication apparatus 10 and the relay apparatus 20 connect wirelessly. Details of the processing of M2610 are as illustrated in FIG. 7.

In M2611, the relay apparatus 20 generates the authorization relay response based on the authorization response received from the authorization server 50, using the authorization relay service control unit 510. The authorization relay service control unit 510 then sends, to the communication apparatus 10, the authorization relay response corresponding to the authorization relay request received in M2606. The communication apparatus 10 receives the authorization relay response from the relay apparatus 20 using the authorization control unit 309. In M2612, the communication apparatus 10 notifies the authorization relay service of the relay apparatus 20 that the authorization has succeeded, using the authorization control unit 309. The relay apparatus 20 receives the notification that the authorization has succeeded from the communication apparatus 10 using the authorization relay service control unit 510.

As described thus far, the relay apparatus 20 can display the authorization type selection screen as a means for launching the authorization application unit. In the case where the private mode has been selected in the authorization type selection screen, the authorized device linking screen is displayed and NFC communication is carried out with the communication apparatus 10. In the case where the group mode has been selected, the authorization request is sent to the authorization server 50, the authorized device linking screen is displayed after carrying out the user authentication and access authority granting processes, and NFC communication is carried out with the communication apparatus 10. Through this, the user 30 can know a time period in which to carry out NFC communication with the communication apparatus 10 based on the selected authorization type, which increases the usability.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-059081, filed Mar. 20, 2014, which is hereby incorporated by reference herein in its entirety.

What is claimed is:

1. A relay apparatus capable of relaying communication between a communication apparatus and a server, the relay apparatus comprising:
   a connection unit configured to connect the communication apparatus by close-proximity wireless communication;
   a first receiving unit configured to receive an authorization request from the communication apparatus connected by the connection unit;
   a selection unit configured to select an authorization type to be used from a first authorization type to authorize a plurality of apparatuses and a second authorization type to authorize one apparatus;
   an accepting unit configured to accept an input of authentication information;
   a first sending unit configured to send the authentication information accepted by the accepting unit to the server;
   a second receiving unit configured to receive an authorization response indicating that an authentication process was successful from the server;
   a relay unit configured to relay the authorization response to the communication apparatus;
   a storage unit configured to store the authorization response in a case where the first authorization type is selected by the selection unit;
   a display control unit configured to cause a display unit to display a screen representing to prompt a user to connect the relay apparatus and another communication apparatus by close-proximity wireless communication in a case where the first authorization type is selected by the selection unit, and not to display the screen in a case where the second authorization type is selected by the selection unit; and
   a second sending unit configured to send the authorization response stored by the storage unit to the another communication apparatus in response to connect the relay apparatus and the another communication apparatus after the screen is displayed by the display control unit.

2. The relay apparatus according to claim 1,
   wherein the storage unit stores the authorization response until the point in time when a predetermined application ends.

3. The relay apparatus according to claim 1,
   wherein the storage unit stores the authorization response until a point in time instructed by the predetermined application.

4. The relay apparatus according to claim 1, further comprising:
   wherein the selection unit selects the authorization type based on a user input.

5. The relay apparatus according to claim 1, wherein the first authorization type is group mode based on the OAuth protocol and the second authorization type is private mode based on the OAuth protocol.

6. The relay apparatus according to claim 1, wherein the storage unit does not store the authorization response in a case there the second authorization type is selected by the selection unit.

7. The relay apparatus according to claim 1,
   wherein the close proximity wireless communication is NFC (Near Field Communication).

8. The relay apparatus according to claim 1,
   wherein a first sending unit, a second receiving unit and a second sending unit carry out communication over a wireless LAN.

9. The relay apparatus according to claim 1,
   wherein the relay apparatus relays communication between the communication apparatus and the server using a predetermined application, and the predetermined application is launched in response to a user instruction.

10. A relay method capable of relaying communication between a communication apparatus and a server, the method comprising:
    connecting the communication apparatus by close-proximity wireless communication;
    receiving an authorization request from the communication apparatus connected in the connecting;
    selecting an authorization type to be used from a first authorization type to authorize a plurality of apparatuses and a second authorization type to authorize one apparatus;
    accepting an input of authentication information;
    sending the authentication information accepted in the accepting to the server;
    receiving an authorization response indicating that an authentication process was successful from the server;
    relay the authorization response to the communication apparatus;
    storing the authorization response in a storage unit in a case where the first authorization type is selected in the selecting;
    causing a display unit to display a screen representing to prompt a user to connect the relay apparatus and another communication apparatus by close-proximity wireless communication in a case where the first authorization type is selected in the selecting, and not to display the screen in a case where the second authorization type is selected in the selecting; and
    a second sending step of sending the authorization response stored by the storage unit to the another communication apparatus in response to connect the relay apparatus and the another communication apparatus after the screen is displayed.

11. A non-transitory computer-readable storage medium storing a computer program for causing a computer to execute a relay method capable of relaying communication between a communication apparatus and a server, the method comprising:
    connecting the communication apparatus by close-proximity wireless communication;
    receiving an authorization request from the communication apparatus connected in the connecting;

selecting an authorization type to be used from a first authorization type to authorize a plurality of apparatuses and a second authorization type to authorize one apparatus;

accepting an input of authentication information;

sending the authentication information accepted in the accepting to the server;

receiving an authorization response indicating that an authentication process was successful from the server;

relaying the authorization response to the communication apparatus;

storing the authorization response in a storage unit in a case where the first authorization type is selected in the selecting;

causing a display unit to display a screen representing to prompt a user to connect the relay apparatus and another communication apparatus by close-proximity wireless communication in a case where the first authorization type is selected in the selecting, and not to display the screen in a case where the second authorization type is selected in the selecting; and a second sending step of sending the authorization response stored by the storage unit to the another communication apparatus in response to connecting the relay apparatus and the another communication apparatus after the screen is displayed.

12. A relay system that relays communication between a communication apparatus and a server, the system comprising:

a connection unit configured to connect the communication apparatus by close-proximity wireless communication;

a first receiving unit configured to receive an authorization request from the communication apparatus connected by the connection unit;

a selection unit configured to select an authorization type to be used from a first authorization type to authorize a plurality of apparatuses and a second authorization type to authorize one apparatus;

an accepting unit configured to accept an input of authentication information;

a first sending unit configured to send the authentication information accepted by the accepting unit to the server;

a second receiving unit configured to receive an authorization response indicating that an authentication process was successful from the server;

a relay unit configured to relay the authorization response to the communication apparatus;

a storage unit configured to store the authorization response in a case where the first authorization type is selected by the selection unit;

a display control unit configured to cause a display unit to display a screen representing to prompt a user to connect the relay apparatus and another communication apparatus by close-proximity wireless communication in a case where the first authorization type is selected by the selection unit, and not to display the screen in a case where the second authorization type is selected by the selection unit; and a second sending unit configured to send the authorization response stored by the storage unit to the another communication apparatus in response to connecting the relay apparatus and the another communication apparatus after the screen is displayed by the display control unit.

* * * * *